United States Patent [19]

Pechanek et al.

[11] Patent Number: 5,649,135
[45] Date of Patent: Jul. 15, 1997

[54] PARALLEL PROCESSING SYSTEM AND METHOD USING SURROGATE INSTRUCTIONS

[75] Inventors: Gerald G. Pechanek, Cary; Clair John Glossner, Durham; Larry D. Larsen, Raleigh, all of N.C.; Stamatis Vassiliadis, Zoetermeer, Netherlands

[73] Assignee: International Business Machines Corporation, Armonk, N.Y.

[21] Appl. No.: 373,128

[22] Filed: Jan. 17, 1995

[51] Int. Cl.$^6$ .................................................. G06F 9/355
[52] U.S. Cl. .................................................. 395/396
[58] Field of Search ................ 364/DIG. 1 MS File, 364/DIG. 2 MS File; 395/410, 412, 413, 415, 375, 419, 421.02, 421.04, 421.1, 427, 800

[56] References Cited

U.S. PATENT DOCUMENTS

| | | | |
|---|---|---|---|
| 4,109,311 | 8/1978 | Blum et al. | 364/200 |
| 4,394,736 | 7/1983 | Bernstein et al. | 364/200 |
| 4,814,978 | 3/1989 | Dennis | 364/200 |
| 5,057,837 | 10/1991 | Colwell et al. | 341/55 |
| 5,163,139 | 11/1992 | Haigh et al. | 395/375 |
| 5,197,135 | 3/1993 | Eickemeyer et al. | 395/375 |
| 5,274,815 | 12/1993 | Trissel et al. | 395/700 |
| 5,299,321 | 3/1994 | Iizuka | 395/375 |
| 5,303,356 | 4/1994 | Vassiliadis et al. | 395/375 |
| 5,303,358 | 4/1994 | Baum | 395/375 |

OTHER PUBLICATIONS

Martin Gold, "Signal Path: TI's Competitive Edge", *Electrical Engineering Times*, Mar. 28, 1994, p. 68.

*Primary Examiner*—Robert B. Harrell
*Attorney, Agent, or Firm*—Steven B. Phillips; John E. Hoel

[57] ABSTRACT

A parallel processing system and method is disclosed, which provides an improved instruction distribution mechanism for a parallel processing array. The invention broadcasts a basic instruction to each of a plurality of processor elements. Each processor element decodes the same instruction by combining it with a unique offset value stored in each respective processor element, to produce a derived instruction that is unique to the processor element. A first type of basic instruction results in the processor element performing a logical or control operation. A second type of basic instruction results in the generation of a pointer address. The pointer address has a unique address value because it results from combining the basic instruction with the unique offset value stored at the processor element. The pointer address is used to access an alternative instruction from an alternative instruction storage, for execution in the processor element. The alternative instruction is a very long instruction word, whose length is, for example, an integral multiple of the length of the basic instruction and contains much more information than can be represented by the basic instruction. A very long instruction word such as this is useful for providing parallel control of a plurality of primitive execution units that reside within the processor element. In this manner, a high degree of flexibility and versatility is attained in the operation of processor elements of a parallel processing array.

23 Claims, 26 Drawing Sheets

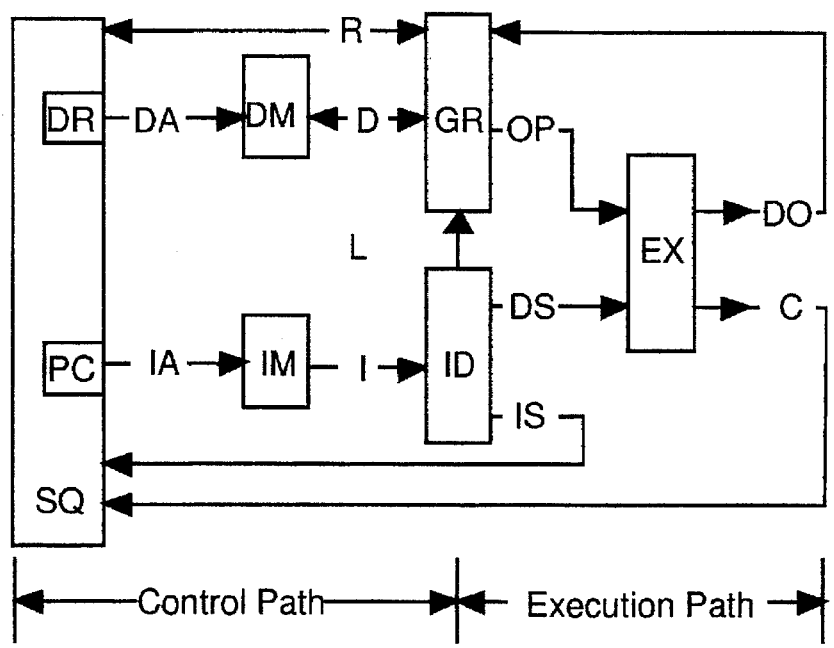

FIG. 1

<u>Blocks</u>

SQ = Sequencer Including DR & PC;
  DR = Data Address Generator
  PC = Program Counter
DM = Data Memory
IM = Instruction Memory
GR = General Purpose Registers
ID = Instruction Decode Logic
EX = Execution Unit <u>Signals</u>

DA = Data Memory Address & Controls
D = Data
IA = Instruction Memory Address & Controls
I = Instructions
R = Sequencer Register Data
OP = Register Operand Data
L = Register Select Signals
IS = Instruction Signals (Branch, Addr. Gen, ...)
DS = Data Signals (ALU, MPY, DR SEL Cntl,...)
DO = Data Output Bus (from Execution Unit)
C = Condition Signal SR = Sequencer General Purpose Registers
DR = Data Path General Purpose Registers
SD = Sequencer Instruction Decode Logic
DD = Data Unit Instruction Decode Logic DX = Data Unit Instruction Decode & Condition Logic
Cy = Global Condition Signals
Cx = Execution Unit Condition Signals
L' = Conditional Register Select Signals
S = Register Selectable Bit (e.g. Sign Bit)

Min/Max Functional Level Program

Min = Maxi         //Maximum Integer Value
Max = Mini         //Minimum Integer Value Do X i = 1, z if (B(i).LT.Min) Min = B(i)
    if (B(i).GT.Max) Max = B(i)

X Continue

---

Min/Max Pseudo C Program

SR_r1 ← pointer to B    //Pointer to B Integer Array

DR_r1 ← Maxi     // Load DR r1 with Maxi constant
DR_r2 ← Mini     // Load DR r2 with Mini constant For (i=1 ; i ≤ z ; i++) {

DR_r3 ← B(i);   //Indexed Load of B(i)

If (r3 <r1)    //Set < flag if true
      DR_r1 ← r3;
    Else
      NOP;

If (r3 >r2)    //Set > flag if true
      DR_r2 ← r3;
    Else
      NOP;
}

FIG. 5

```
Min/Max Conditional Select Assembly Program
           (32-bit Integer Array)
DL_SR r1  ← Mem(disp3)    //B Array Start Pointer
DL_SR r2  ← Mem(disp3)    //B Array End Pointer + 1

DL_DR r1  ← Mem(disp1)    //Direct Load DR r1 ◄ Maxi
DL_DR r2  ← Mem(disp2)    //Direct Load DR r2 ◄ Mini A(a) IL_DR r3 ← Mem(at SR_r1)  //Indexed Load of B(i)
                               //r1 auto incremented (b) ECOMP r3, r1    //Set <,>, = Condition flag
 (c) CML r3, r1, r1  //Conditional Move Less-Than
                     //If < b=1 Then Move r3 to r1
                     //Else Move r1 to r1
 (d) ECOMP r3, r2    //Set <, >, = Condition flag
 (e) CMG r3, r2, r2  //Conditional Move Grtr-Than
                     //If > b=1 Then Move r3 to r2
                     //Else Move r2 to r2
 (f) SCOMP r1, r2    //Set SQ Condition flags
 (g)   BL A          //Loop not done Branch to A
 (h)   NOP           //Due to Branch with Execute
 (i) Stop            //Loop done Stop
```

Steps numbered (a, b, . . . ,i)

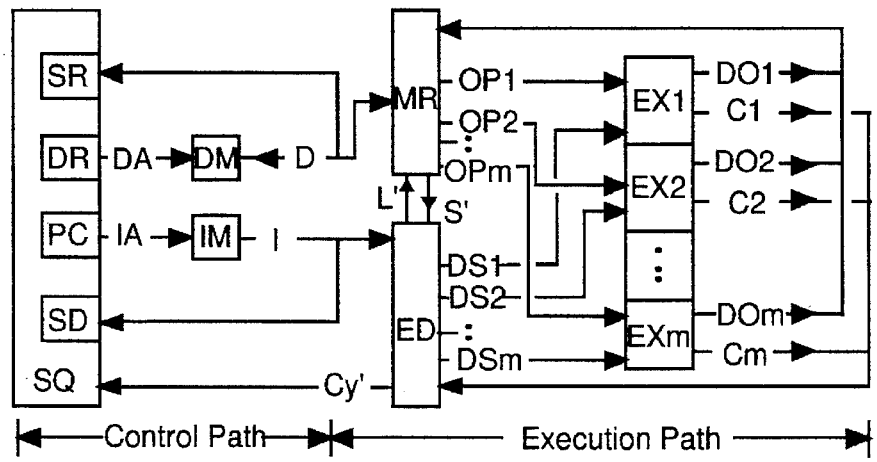

MR = Multiple Port Register File
EX1, EX2, . . . ., EXm = Multiple Execution Units
ED = Multiple Decode & Conditional Logic
S' = Register Selectable Bits (e.g. Sign Bits)
DS' = Multiple Data Signals
DO1, DO2, . . , DOm = Multiple Data Output Buses
Cy' = Multiple Global Condition Signals
C1, C2, ..., Cm = Multiple EX Condition Signals

VLIW Min/Max Conditional Select Assembly Program
(32-bit Integer Array)

A(a) IL_DR r3 ← Mem(at SR_r1)   //Indexed Load of B(i)
                                //r1 auto incremented (b) ECOMP r3, r1         //Set <,>, = Condition flag (c) SRGT#1 → CML r3, r1, r1 | ECOMP r3, r2   // VLIW
                         //Conditional Move Less-Than
                         //If < b=1 Then Move r3 to r1
                         //Else Move r1 to r1
                         //Set <,>, = Condition flag (d) CMG r3, r2, r2       //Conditional Move Grtr-Than
                         //If > b=1 Then Move r3 to r2
                         //Else Move r2 to r2
(e) SCOMP r1, r2         //Set SQ Condition flags
(f)  BL A                //Loop not done Branch to A
(g)  NOP                 //Due to Branch with Execute
(h) Stop                 //Loop done Stop

FIG. 9

VLIW Min/Max Conditional Select Assembly Program
(32-bit Integer Array)

A(a) IL_DR r3 ← Mem(at SR_r1)   //Indexed Load of B(i)
                                 //r1 auto incremented (b) ECOMP r3, r1                //Set PE <,>, = Condition flag (c) SRGT #1 →  CML r3, r1, r1  |  ECOMP r3, r2   //PE
            → SCOMP r1, r2                       //Sequencer
               // PE & Sequencer VLIW #1
               //Conditional Move Less-Than
               //If < b=1 Then Move r3 to r1
               //Else Move r1 to r1
               //Set PE <, >, = Condition flag
               //Set SQ Condition flags (d) SRGT#2    CMG r3, r2, r2                     //PE
           →  BL  A                              //Sequencer //PE & Sequencer VLIW #2
              //Conditional Move Grtr-Than
              //If > b=1 Then Move r3 to r2
              //Else Move r2 to r2
              //Loop not done Branch to A (e) NOP
(f) Stop      //Due to Branch with Execute
              //Loop done Stop

FIG. 10

VLIW Min/Max Conditional Select Assembly Program
(32-bit Integer Array)

A(a) IL_DR r3 ← Mem(at SR_r1)  //Indexed Load of B(i)
                               //r1 auto incremented (b) ECOMP r3, r1               //Set PE <,>, = Condition flag (c) SRGT#1 ┬→ CML r3, r2, r1   | ECOMP r3, r2   //PE-0
           ├→ CML r3, r1, r1   | ECOMP r3, r2   //PE-1
           ⋮        ⋮                  ⋮           ⋮
           ├→ CML r3, r1, r1   | ECOMP r3, r2   //PE-N-1
           └→ SCOMP r1, r2                       //Sequencer // PE & Sequencer VLIW #1
//Conditional Move Less-Than
//If < b=1 Then Move r3 to r1
//Else Move r1 to r1
//Set PE <, >, = Condition flag
//Set SQ Condition flags (d) SRGT#2 ┬→ CMG r3, r2, r2                    //PE-0
           ├→ CMG r3, r2, r2                    //PE-1
           ⋮        ⋮
           ├→ CMG r3, r2, r2                    //PE-N-1
           └→ BL  A                              //Sequencer //PE & Sequencer VLIW #2
//Conditional Move Grtr-Than
//If > b=1 Then Move r3 to r2
//Else Move r2 to r2
//Loop not done Branch to A (e) NOP      //Due to Branch with Execute
(f) Stop     //Loop done Stop

| PE-0/0,0 | | | | |
|---|---|---|---|---|
| R0 | p0,0 | p7,0 | p0,7 | p7,7 |
| R1 | p0,0+p0,7 | | p0,0-p0,7 | |
| R2 | p7,0+p7,7 | | p7,0-p7,7 | |

D0, I0

| ALU | | | | | |
|---|---|---|---|---|---|
| OPCODE | OPX | Rx | Ry | xb | yb |
| ALU Btfy 010100 | 0010 | R0 | R0 | b1 | b3 |

| PE-1/0,1 | | | | |
|---|---|---|---|---|
| R0 | p0,1 | p7,1 | p0,6 | p7,6 |
| R1 | p0,1+p0,6 | | p0,1-p0,6 | |
| R2 | p7,1+p7,6 | | p7,1-p7,6 | |
| R0 | p1,0 | p6,0 | p1,7 | p6,7 |
| R1 | p1,0+p1,7 | | p1,0-p1,7 | |
| R2 | p6,0+p6,7 | | p6,0-p6,7 | |

I0, I1, D0, D1

PE-4/1,0

| PE-5/1,1 | | | | |
|---|---|---|---|---|
| R0 | p1,1 | p6,1 | p1,6 | p6,6 |
| R1 | p1,1+p1,6 | | p1,1-p1,6 | |
| R2 | p6,1+p6,6 | | p6,1-p6,6 | |

D1, I1

| PE-2/0,2 | | | | |
|---|---|---|---|---|
| R0 | p0,2 | p7,2 | p0,5 | p7,5 |
| R1 | p0,2+p0,5 | | p0,2-p0,5 | |
| R2 | p7,2+p7,5 | | p7,2-p7,5 | |
| R0 | p2,0 | p5,0 | p2,7 | p5,7 |
| R1 | p2,0+p2,7 | | p2,0-p2,7 | |
| R2 | p5,0+p5,7 | | p5,0-p5,7 | |

I0, I2, D0, D2

PE-8/2,0

| PE-6/1,2 | | | | |
|---|---|---|---|---|
| R0 | p1,2 | p6,2 | p1,5 | p6,5 |
| R1 | p1,2+p1,5 | | p1,2-p1,5 | |
| R2 | p6,2+p6,5 | | p6,2-p6,5 | |
| R0 | p2,1 | p5,1 | p2,6 | p5,6 |
| R1 | p2,1+p2,6 | | p2,1-p2,6 | |
| R2 | p5,1+p5,6 | | p5,1-p5,6 | |

I1, I2, D1, D2

PE-9/2,1

| PE-3/0,3 | | | | |
|---|---|---|---|---|
| R0 | p0,3 | p7,3 | p0,4 | p7,4 |
| R1 | p0,3+p0,4 | | p0,3-p0,4 | |
| R2 | p7,3+p7,4 | | p7,3-p7,4 | |
| R0 | p3,0 | p4,0 | p3,7 | p4,7 |
| R1 | p3,0+p3,7 | | p3,0-p3,7 | |
| R2 | p4,0+p4,7 | | p4,0-p4,7 | |

I0, I3, D0, D3

PE-C/3,0

| PE-7/1,3 | | | | |
|---|---|---|---|---|
| R0 | p1,3 | p6,3 | p1,4 | p6,4 |
| R1 | p1,3+p1,4 | | p1,3-p1,4 | |
| R2 | p6,3+p6,4 | | p6,3-p6,4 | |
| R0 | p3,1 | p4,1 | p3,6 | p4,6 |
| R1 | p3,1+p3,6 | | p3,1-p3,6 | |
| R2 | p4,1+p4,6 | | p4,1-p4,6 | |

I1, I3, D1, D3

PE-D/3,1

| FIG. 20A | FIG. 20B |
|---|---|

CELL NOTATION

| TOP VALUE 1-D TRANSFORMED SINGLE SUBSCRIPT NOTATION |
| --- |
| BOTTOM VALUE 2-D DOUBLE SUBSCRIPT NOTATION |

| COLUMN → | 0 | 1 | 2 | FOLD | 5 | 6 | 7 |
|---|---|---|---|---|---|---|---|
| 0th row | p0<br>p0,0 | p8<br>p1,0 | p16<br>p2,0 | p24<br>p3,0 | p32<br>p4,0 | p40<br>p5,0 | p48<br>p6,0 | p56<br>p7,0 |
| 1st row | p1<br>p0,1 | p9<br>p1,1 | p17<br>p2,1 | p25<br>p3,1 | p33<br>p4,1 | p41<br>p5,1 | p49<br>p6,1 | p57<br>p7,1 |
| 2nd row | p2<br>p0,2 | p10<br>p1,2 | p18<br>p2,2 | p26<br>p3,2 | p34<br>p4,2 | p42<br>p5,2 | p50<br>p6,2 | p58<br>p7,2 |
| 3rd row | p3<br>p0,3 | p11<br>p1,3 | p19<br>p2,3 | p27<br>p3,3 | p35<br>p4,3 | p43<br>p5,3 | p51<br>p6,3 | p59<br>p7,3 |
| FOLD — 4th row | p4<br>p0,4 | p12<br>p1,4 | p20<br>p2,4 | p28<br>p3,4 | p36<br>p4,4 | p44<br>p5,4 | p52<br>p6,4 | p60<br>p7,4 | — FOLD |
| 5th row | p5<br>p0,5 | p13<br>p1,5 | p21<br>p2,5 | p29<br>p3,5 | p37<br>p4,5 | p45<br>p5,5 | p53<br>p6,5 | p61<br>p7,5 |
| 6th row | p6<br>p0,6 | p14<br>p1,6 | p22<br>p2,6 | p30<br>p3,6 | p38<br>p4,6 | p46<br>p5,6 | p54<br>p6,6 | p62<br>p7,6 |
| 7th row | p7<br>p0,7 | p15<br>p1,7 | p23<br>p2,7 | p31<br>p3,7 | p39<br>p4,7 | p47<br>p5,7 | p55<br>p6,7 | p63<br>p7,7 |

FOLD

\* MAKE ABOVE TWO FOLDS THEN FOLD RESULTANT SQUARE ON THE DIAGONAL.

| R0 | p0,0 / p0 | p7,0 / p56 | p0,7 / p7 | p7,7 / p63 | —D0— I0 |
|---|---|---|---|---|---|
| R1 | p0+p63 || p0-p63 |||
| R2 | p7+p56 || p7-p56 |||

ALU

| OPCODE | OPX | Rx | Ry | xb | yb |
|---|---|---|---|---|---|
| ALU Btfy 010100 | 0010 | R0 | R0 | b2 | b1 |

PE-1/0,1

| R0 | p0,1 / p1 | p7,1 / p57 | p0,6 / p6 | p7,6 / p62 | —I0— I1 |
|---|---|---|---|---|---|
| R1 | p1+p62 || p1-p62 |||
| R2 | p6+p57 || p6-p57 |||

PE-4/1,0

| R0 | p1,0 / p8 | p6,0 / p48 | p1,7 / p15 | p6,7 / p55 | |
|---|---|---|---|---|---|
| R1 | p8+p55 || p8-p55 || —D0— |
| R2 | p15+p48 || p15-p48 || —D1— |

PE-5/1,1

| R0 | p1,1 / p9 | p6,1 / p49 | p1,6 / p14 | p6,6 / p54 | —D1— I1 |
|---|---|---|---|---|---|
| R1 | p9+p54 || p9-p54 |||
| R2 | p14+p49 || p14-p49 |||

PE-2/0,2

| R0 | p0,2 / p2 | p7,2 / p58 | p0,5 / p5 | p7,5 / p61 | —I0— I2 |
|---|---|---|---|---|---|
| R1 | p2+p61 || p2-p61 |||
| R2 | p5+p58 || p5-p58 |||

PE-8/2,0

| R0 | p2,0 / p16 | p5,0 / p40 | p2,7 / p23 | p5,7 / p47 | |
|---|---|---|---|---|---|
| R1 | p16+p47 || p16-p47 || —D0— |
| R2 | p23+p40 || p23-p40 || —D2— |

PE-6/1,2

| R0 | p1,2 / p10 | p6,2 / p50 | p1,5 / p13 | p6,5 / p53 | —I1— I2 |
|---|---|---|---|---|---|
| R1 | p10+p53 || p10-p53 |||
| R2 | p13+p50 || p13-p50 |||

PE-9/2,1

| R0 | p2,1 / p17 | p5,1 / p41 | p2,6 / p22 | p5,6 / p46 | |
|---|---|---|---|---|---|
| R1 | p27+p46 || p17-p46 || —D1— |
| R2 | p22+p41 || p22-p41 || —D2— |

PE-3/0,3

| R0 | p0,3 / p3 | p7,3 / p59 | p0,4 / p4 | p7,4 / p60 | —I0— I3 |
|---|---|---|---|---|---|
| R1 | p3+p60 || p3-p60 |||
| R2 | p4+p59 || p4-p59 |||

PE-C/3,0

| R0 | p3,0 / p24 | p4,0 / p32 | p3,7 / p31 | p4,7 / p39 | |
|---|---|---|---|---|---|
| R1 | p24+p39 || p24-p39 || —D0— |
| R2 | p31+p32 || p31-p32 || —D3— |

PE-7/1,3

| R0 | p1,3 / p11 | p6,3 / p51 | p1,4 / p12 | p6,4 / p52 | —I1— I3 |
|---|---|---|---|---|---|
| R1 | p11+p52 || p11-p52 |||
| R2 | p12+p51 || p12-p51 |||

PE-D/3,1

| R0 | p3,1 / p25 | p4,1 / p33 | p3,6 / p30 | p4,6 / p38 | |
|---|---|---|---|---|---|
| R1 | p25+p38 || p25-p38 || —D1— |
| R2 | p30+p33 || p30-p33 || —D3— |

FIG. 23A

| FIG. 23A | FIG. 23B |
|---|---|

FIG. 23

PARALLEL PROCESSING SYSTEM AND METHOD USING SURROGATE INSTRUCTIONS

FIELD OF THE INVENTION

The invention disclosed broadly relates to data processing systems and methods, and more particularly relates to improvements in the parallel processing architectures.

BACKGROUND OF THE INVENTION

Related patent applications:

The invention disclosed herein is related to the U.S. patent application Ser. No. 07/864,112, filed Apr. 6, 1992, now abandoned, entitled "Massively Parallel Array Processor", by G. G. Pechanek, et al., assigned to the IBM Corporation and incorporated herein by reference.

The invention disclosed herein is also related to the co-pending U.S. patent application by G. G. Pechanek, et al. which is entitled "DISTRIBUTED CONTROL PIPELINE WITH JOINT PE/SEQUENCER CONTROL", Ser. No. 08/365,858, filed Dec. 29, 1994, IBM Docket Number RA9-94-041, assigned to the International Business Machines Corporation, and incorporated herein by reference.

The invention disclosed herein is also related to the co-pending U.S. patent application by G. G. Pechanek, et al. which is entitled "ARRAY PROCESSOR TOPOLOGY RECONFIGURATION SYSTEM AND METHOD", Ser. No. 08/366,140, filed Dec. 29, 1994, IBM Docket Number RA9-94-043, assigned to the International Business Machines Corporation, and incorporated herein by reference.

Many signal processors, e.g. ISP-5.6, use instructions which produce multiple independent execution actions to occur per instruction cycle. These "compound-instructions" are typically difficult to encode within a single instruction word since they must specify multiple operations. Consequently, compromises are typically done in architecting the compound instructions, thereby limiting the flexibility and generality in the specification of operands and result destinations. A number of alternatives to providing compound instructions have been proposed. In particular the G. D. Jones, et al., "Selecting Predecoded Instructions with a Surrogate", IBM TDB, Vold. 36, No. 6A, June 1993, p. 35, and G. D. Jones, et al., "Pre-Composed Superscaler Architecture", IBM TDB, Vol. 37, No. 9, September 1994, p. 447. The approach used herein is an extension of the concepts described in these two papers. This invention is primarily concerned with new concepts not covered in either of these earlier works.

In the surrogate concept, a Very Long Instruction Word (VLIW) is created from multiple simplex instructions. Multiple VLIWs can be created and implemented either in Read Only Memory (ROM) or created by a sequence of instructions which are identified to load the surrogate memory. A surrogate simplex instruction is then used to point to a specific VLIW for execution. In the PEs, a VLIW is stored in a surrogate memory made up of multiple instruction slots with each slot associated with a 32-bit execution unit plus slots assigned for Load and Store joint SP/PE instructions.

OBJECTS OF THE INVENTION

It is an object of the invention to provide an improved programmable processor architecture for parallel processing arrays.

It is another object of the invention to provide a high degree of flexibility and versatility in the operation of processor elements of a parallel processing array.

SUMMARY OF THE INVENTION

These and other objects, features and advantages are accomplished by the parallel processing system and method disclosed herein, which provides an improved instruction distribution mechanism for a parallel processing array. The invention broadcasts a basic instruction to each of a plurality of processor elements. Each processor element decodes the same instruction by combining it with a unique offset value stored in each respective processor element, to produce a derived instruction that is unique to the processor element. A first type of basic instruction results in the processor element performing a logical operation. A second type of basic instruction provides a pointer address. The pointer address has a unique address value because it results from combining the basic instruction with the unique offset value stored at the processor element. The pointer address is used to access an alternative instruction from an alternative instruction storage, for execution in the processor element.

The alternative instruction is a very long instruction word, whose length is, for example, an integral multiple of the length of the basic instruction and contains much more information than can be represented by a single instruction. A very long instruction word such as this is useful for providing parallel control of a plurality of primitive execution units that reside within the processor element. In this manner, a high degree of flexibility and versatility is attained in the operation of processor elements of a parallel processing array.

The parallel processing array within which the invention finds application is based on a single instruction stream, multiple data stream (SIMD) system organization. The invention can also be applied where several SIMD clusters of processor elements are organized into an overall multiple instruction stream, multiple data stream (MIMD) system organization.

DESCRIPTION OF THE FIGURES

These and other objects, features and advantages will be more fully appreciated with reference to the accompanying figures.

FIG. 1 is an illustration of a RISC SISD control flow.

FIG. 5 is an illustration of Min/Max high level programs.

FIG. 7 is an illustration of a Min/Max conditional select assembly program.

FIG. 8 is an illustration of a VLIW conditional select model.

FIG. 9 is an illustration of a VLIW Min/Max conditional select assembly program number 1.

FIG. 10 is an illustration of a single VLIW-PE Min/Max conditional select assembly program number 2.

FIG. 12 is an illustration of a VLIW Min/Max conditional select assembly program number 3.

FIGS. 14, 14(a), 14(b), and 14(c) is an illustration of a VLIW precedence graph.

FIG. 17 is divided into FIGS. 17A and 17B for convenience.

FIG. 19 is divided into FIGS. 19A and 19B for convenience.

FIG. 20 is divided into FIGS. 20A and 20B for convenience.

FIG. 21 is divided into FIGS. 21A and 21B for convenience.

FIG. 22 is an illustration of a linear transformed 2-D array data format.

FIG. 23 is divided into FIGS. 23A and 23B for convenience.

DISCUSSION OF THE PREFERRED EMBODIMENT

Figure 15:
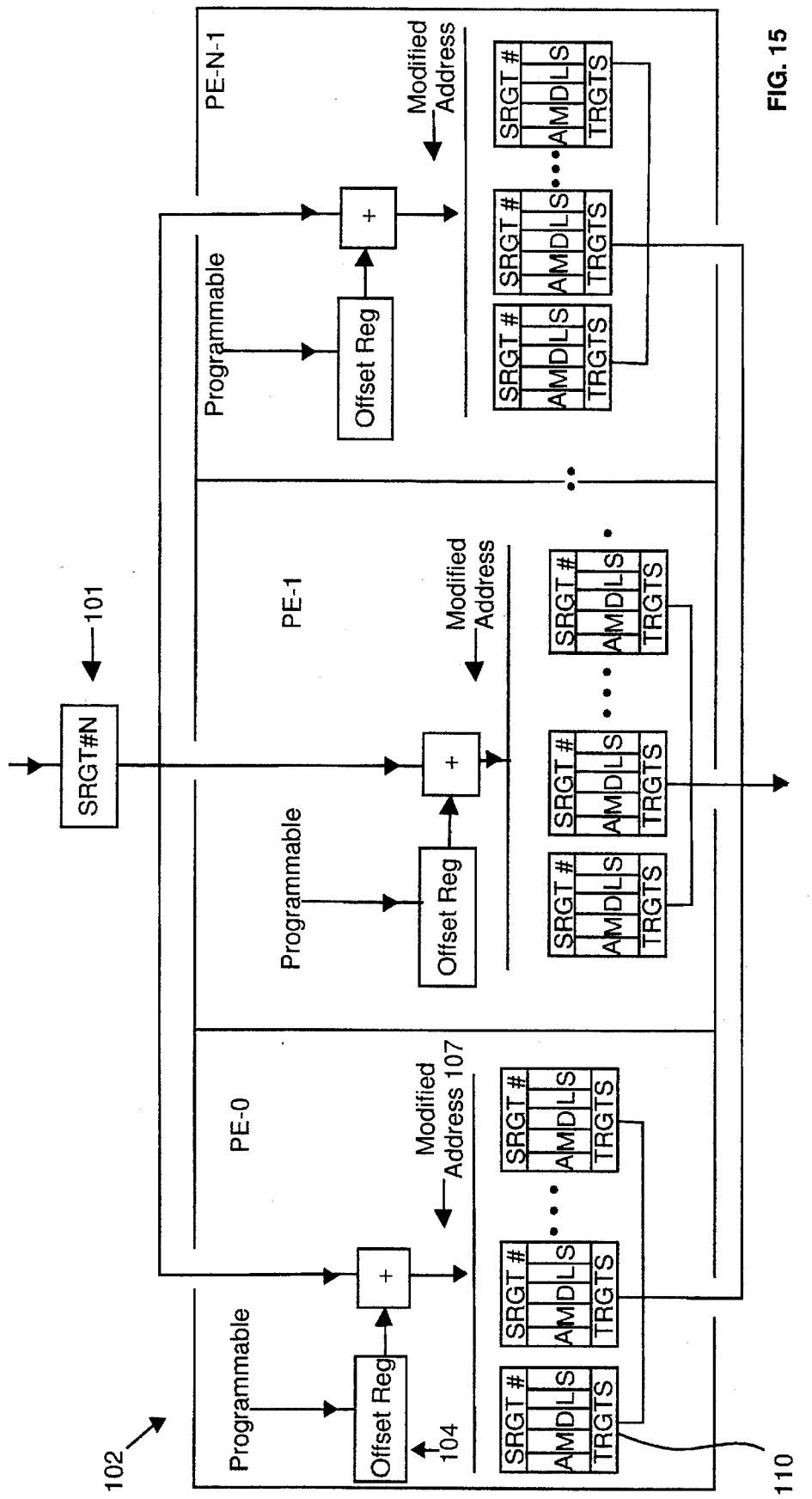
FIG. 15 is an illustration of a multiple VLIW PE precedence graph.
Figure 19A:
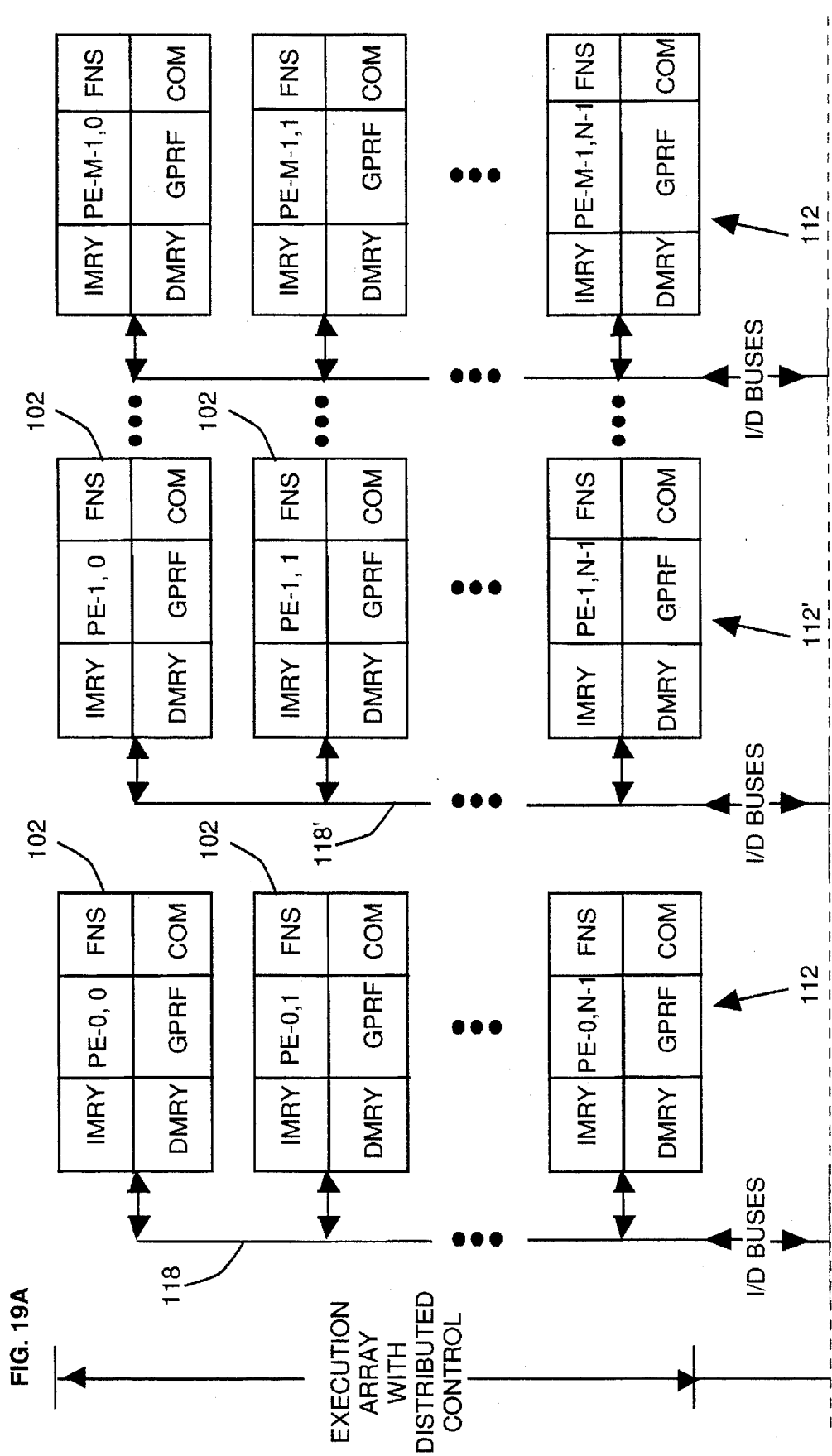
FIG. 19 is an illustration of high level Mwave array machine organization multiple control units.
Figure 19B:
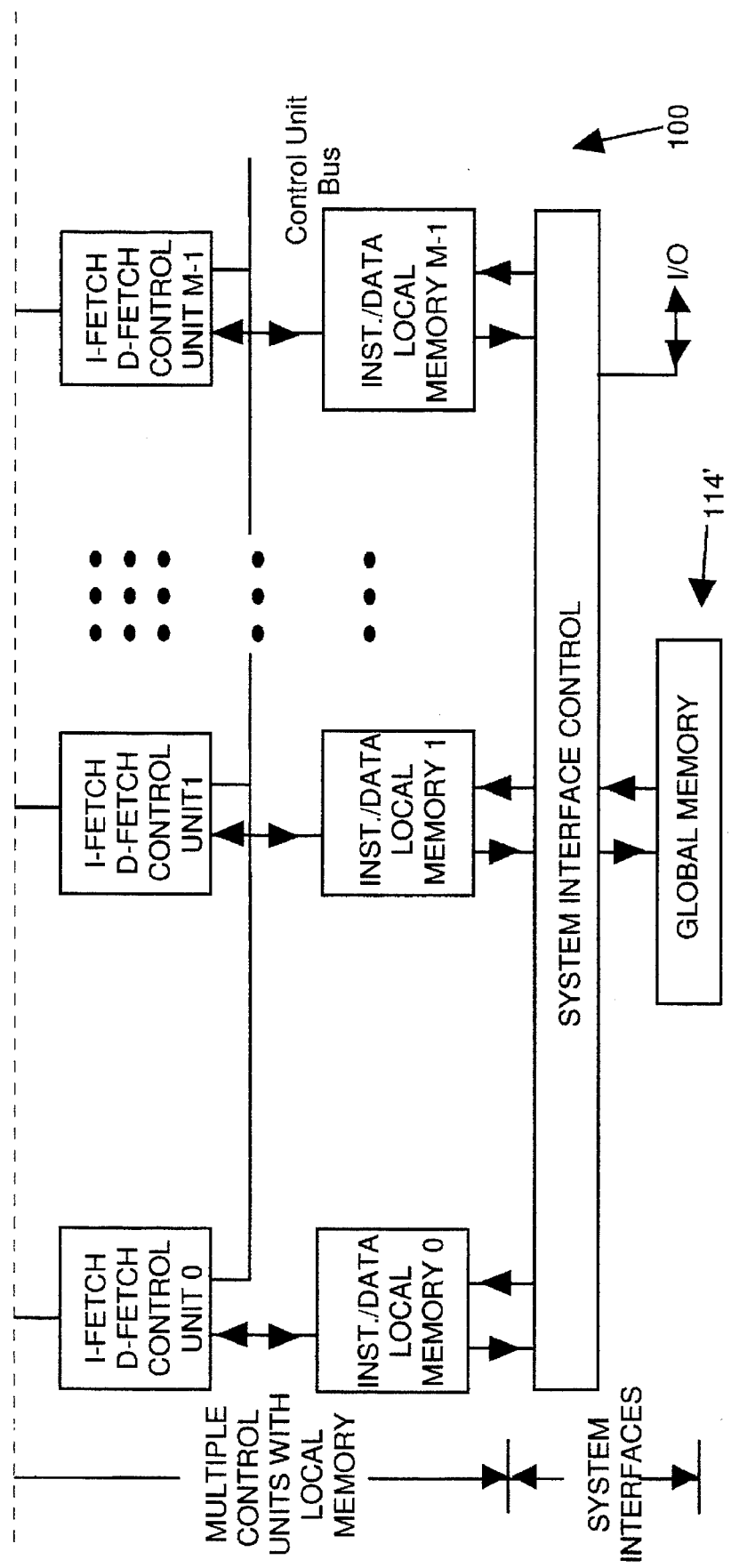

The invention provides an improved instruction distribution mechanism for a parallel processing array, such as the MIMD array embodiment 100 shown in FIG. 19. The invention broadcasts a basic instruction 101 in FIG. 17, to each of a plurality of processor elements 102, shown in FIG. 19. Each processor element 102 decodes the same instruction 101 by combining it with a unique offset value 104 of FIG. 15 stored in each respective processor element 102, to produce a derived instruction that is unique to the processor element. A first type of basic instruction 101 results in the processor element performing a logical or arithmetic operation. A second type of basic instruction 101 results in the generation of a pointer address 107 in FIG. 16. The pointer address 107 has a unique address value because it results from combining the basic instruction 101' with the unique offset value 104 stored at the processor element 102. The pointer address 107 is used to access an alternative instruction 108 from an alternative instruction storage 110 of FIG. 16, for execution in the processor element 102. The alternative instruction 108 is a very long instruction word, whose length is, for example, an integral multiple of the length of the basic instruction 101 or 101' and contains much more information than can be represented by a single instruction. A very long instruction word 108 such as this is useful for providing parallel control of a plurality of primitive execution units EX1, EX2, etc. that reside within the processor element 102 of FIG. 8. In this manner, a high degree of flexibility and versatility is attained in the operation of processor elements of a parallel processing array.

Figure 11:
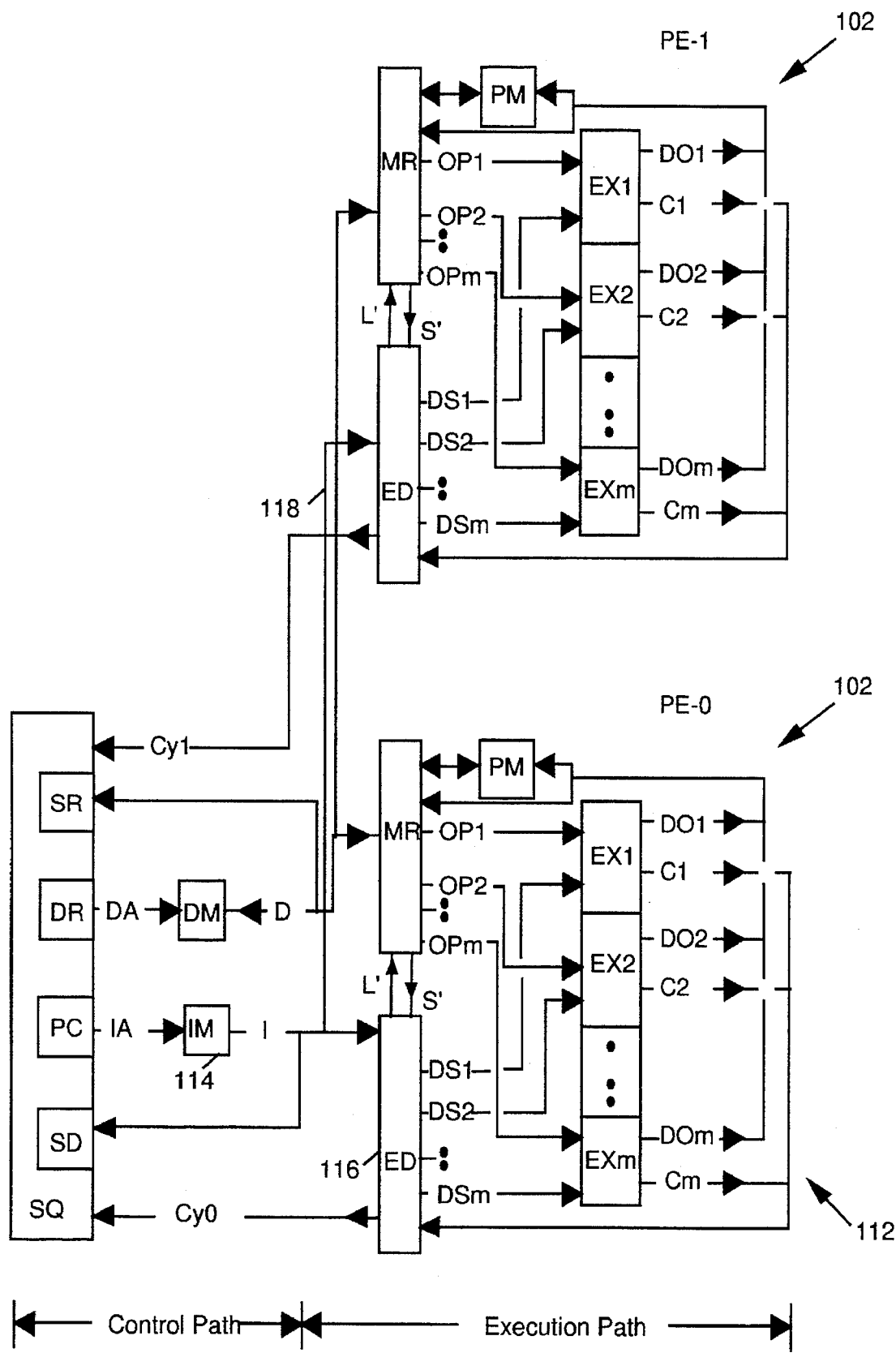
FIG. 11 is an illustration of two VLIW data paths single control flow.
Figure 13:
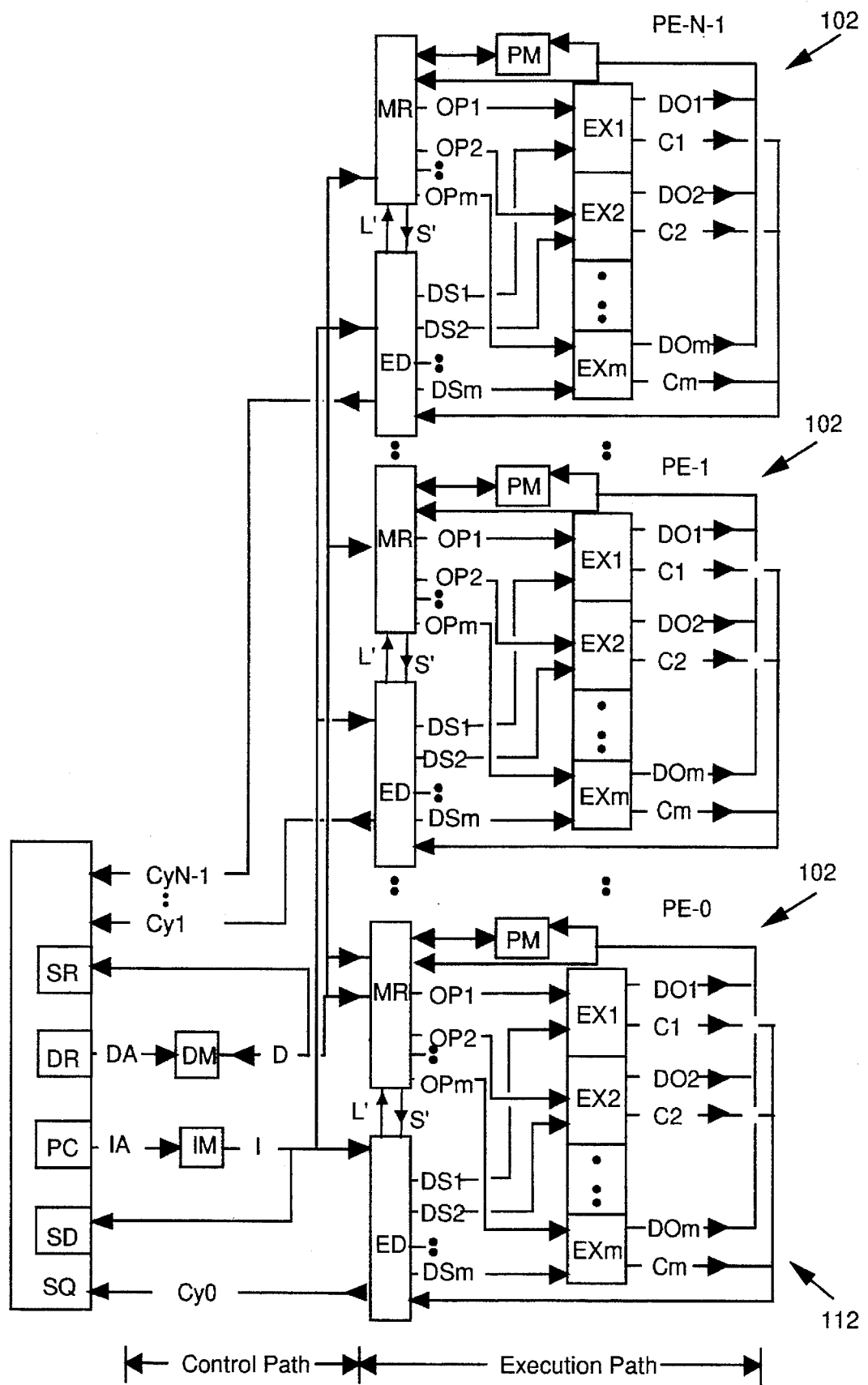
FIG. 13 is an illustration of an N VLIW data paths single control flow.

The parallel processing array within which the invention finds application is based on a single instruction stream, multiple data stream (SIMD) system organization 112, as shown in FIGS. 11 and 13. The invention can also be applied where several SIMD clusters 112 of processor elements 102 are organized into an overall multiple instruction stream, multiple data stream (MIMD) system organization, as in FIG. 19.

The SIMD parallel processing array 112 of FIG. 11 includes a memory means 114, for storing a first type primary instruction 101 which, when executed performs a logical operation, a second type primary instruction 101', which when executed generates an address pointer 107. This instruction can also provide control functions, such as local or store instructions. The decoder 116 (ED) includes storage 110 for a first and second alternate instructions 108 stored at first and second locations accessed by first and second address pointers 107, respectively.

A first processor element 102 (PE-0) of FIG. 11 is coupled to the memory means 114 over an instruction bus 118, the first processor element 102 (PE-0) having a first unique offset value 104, for executing the instructions 101 and 101'. The first processor element 102 (PE-0) includes an instruction decode 116 coupled to the instruction bus 118, for processing the first type primary instruction 101 received on the instruction bus 118, to perform a logical operation.

In accordance with the invention, the instruction decode 116 of the first processor element processes the first unique offset value 104 thereof with the second type primary instruction 101' received on the instruction bus 118, to generate a first address pointer 107 to a first alternate instruction 108 in the storage 110, and in response thereto the storage 110 outputs the first alternate instruction 108 to the first processor element 102 (PE-0).

A second processor element 102 (PE-1) of FIG. 11 is coupled to the memory means 114 over the instruction bus 118, the second processor element having a second unique offset value 104, for executing the instructions 101 and 101'. The second processor element includes an instruction decode 116 coupled to the instruction bus 118, for processing the first type primary instruction 101 received on the instruction bus 118, to perform a logical operation.

Further in accordance with the invention, the instruction decode 116 of the second processor element 102 (PE-1) processes the second unique offset value 104 thereof with the second type primary instruction 101' received on the instruction bus 118, to generate a second address pointer 107 to a second alternate instruction 108 in the storage 110, and in response thereto the storage 110 outputs the second alternate instruction 108 to the second processor element 102 (PE-1).

In this manner, a single instruction 101 or 101' broadcast from the memory means 114, can selectively control diverse operations in the first and second processor elements.

The memory means can be a single storage device, or it can be partitioned as a hierarchical memory for storage means 114, for storing the primary instructions 101 and 101'. A second storage means 110, is provided in the processor elements 102 for storing the alternate instructions 108.

In the preferred embodiment of the invention, the second type primary instructions 101' are surrogate instructions and the alternate instructions 108 are very long instruction words that are larger than the primary instructions 101 or 101'. The primary instructions 101 and 101' have a unit length, for example 32 binary bits, and the alternate instructions 108 have a length which is an integral multiple of the unit length, for example eight times 32 binary bits, which is 256 binary bits.

Figure 16:
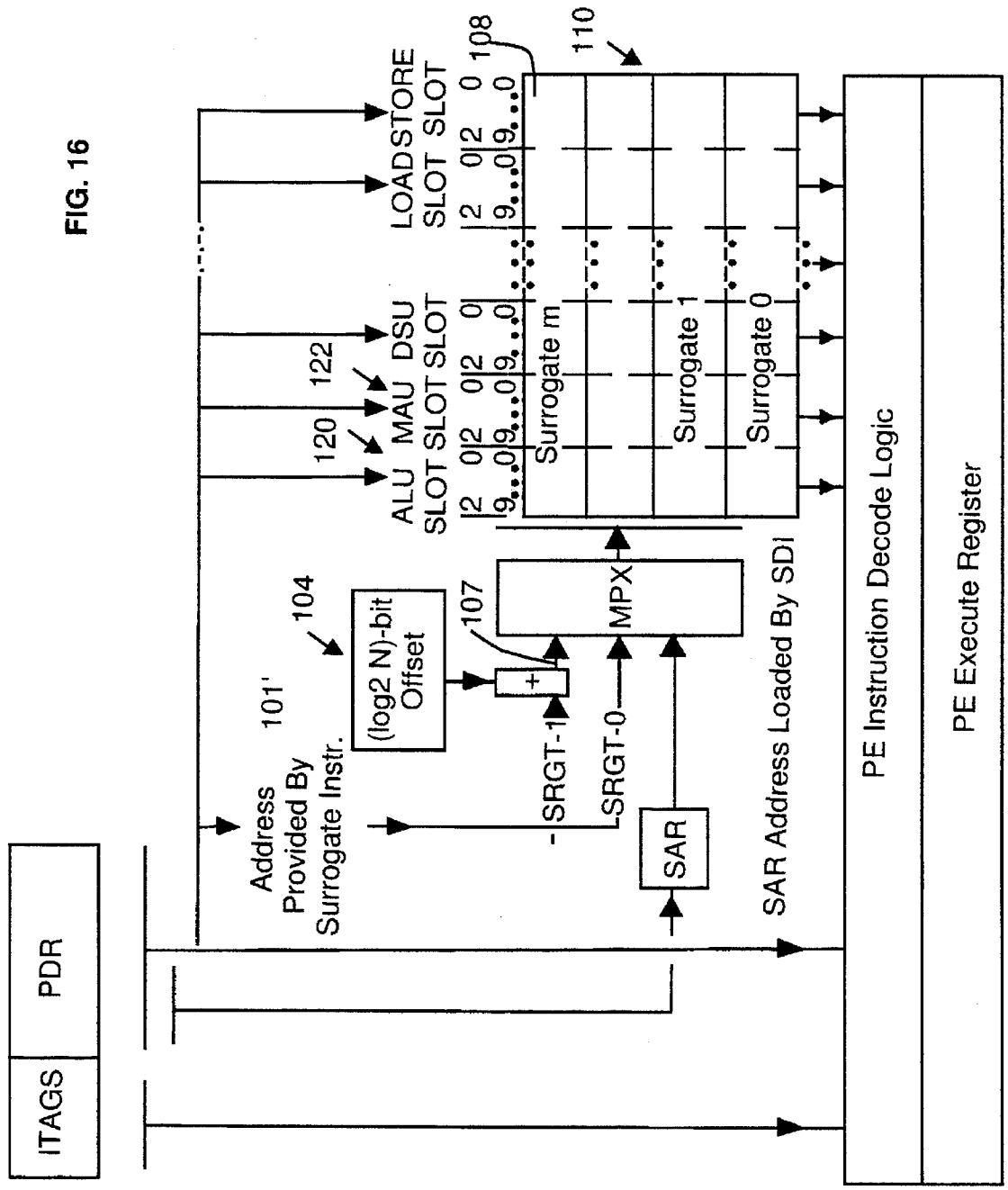
FIG. 16 is an illustration of a PE surrogate data flow.

In another feature of the invention, each of the first and second processor elements PE-0 and PE-1 of FIG. 11 has a first type execution unit Ex1 and a second type execution unit Ex2 and each of the first and second alternate instructions 108 has a first executable portion 120 in FIG. 16 for execution in the first type execution unit Ex1 and a second executable portion 122 of FIG. 16 for execution in the second type execution unit Ex2.

The first unique offset value 104 for PE-0 and the second unique offset value 104 for PE1 can be fixed values or alternately they can be programmable values for each processor element 102, that can be changed from time to time. The offset values 104 for each of two processor elements 102 can also be made the same, where an identical mode of operation is desired for the two processor elements 102.

In another feature of the invention, the first alternate instruction 108 is located at a first pointer address 107 having a value equal to the sum of a base value and a first offset value. The second type primary instruction 101' includes the base value. In decoding the instruction, the first processor element 102 (PE-0) adds the first unique offset value 104 and the base value from the second type primary instruction 101' to generate the first pointer address 107 in FIG. 16. Similarly, the second alternate instruction 108 is located at a second pointer address 107, the address having a value equal to the sum of the base value and a second offset value. The second type primary instruction includes the base value. In decoding the instruction, the second processor element 102 (PE-1) adds the second unique offset value 104 and the base value from the second type primary instruction 101' to generate the second pointer address 107.

Two processor elements 102 (PE-1,0 and PE-1,1) in a second SIMD cluster 112' can be combined with the first two processor elements 102 (PE-0,0 and PE-0,1) in FIG. 19, to form a MIMD array 100. Here, the memory means 114', stores a third type primary instruction 101 which, when executed performs a logical or control operation, a fourth type primary instruction 101', which when executed generates an address pointer 107, and a third and fourth alternate instructions 108 stored at third and fourth locations accessed by third and fourth address pointers 107, respectively.

A third processor element 102 (PE-1,0) is coupled to the memory means 114' over a second instruction bus 118', the third processor element having a third unique offset value 104, for executing the instructions 101 and 101'. The third processor element 102 includes an instruction decode coupled to the second instruction bus, for processing the third type primary instruction 101 received on the second instruction bus 118', to perform a logical or control operation.

In accordance with the invention, the instruction decode of the third processor element 102 (PE-1,0) processes the third unique offset value 104 thereof with the fourth type primary instruction 101' received on the second instruction bus 118', to generate a third address pointer 107 to a third alternate instruction in the memory means, and in response thereto the memory means outputs the third alternate instruction to the third processor element.

A fourth processor element 102 (PE-1,1) is coupled to the memory means 114' over the second instruction bus 118', the fourth processor element having a fourth unique offset value 104, for executing the instructions. The fourth processor element includes an instruction decode coupled to the second instruction bus, for processing the third type primary instruction 101 received on the second instruction bus 118', to perform a logical or control operation.

Further in accordance with the invention, the instruction decode of the fourth processor element 102 (PE-1,1) processes the fourth unique offset value thereof with the fourth type primary instruction 101' received on the second instruction bus 118', to generate a fourth address pointer 107 to a fourth alternate instruction 108 in the memory means, and in response thereto the memory means outputs the fourth alternate instruction to the fourth processor element.

In this manner, the first, second, third and fourth processor elements form a multiple instruction, multiple data multiprocessor array, as is shown in FIG. 19.

Mfast is a scalable array of VLIW machines, that in accordance with the invention, a surrogate instruction containing an address that points to specific VLIWs that are to be executed. In this section, the concepts supporting the Mfast processor VLIW control flow are described. The starting point for this description is a high level abstraction of a basic uniprocessor model which is then expanded step by step into the basic Mfast control flow model. By using a conditional register selection model the VLIW concept on Mfast is described. In the figures to follow, the basic block mnemonics are named in the figures with each figure including only the terms for the new blocks added, building upon the previous figures.

The basic RISC uniprocessor single instruction single data (SISD) control flow model is shown in FIG. 1. In this figure, the blocks of the model shown are split into two basic sections; the control path and the execution path. As can be noted in the figure, the control path section includes part of the data path since, by definition for these models, control instructions, e.g., loads and stores, are the only means of moving data between memory and the processor. This load/store architecture feature is maintained throughout the various models. In addition, all models are of the Harvard architecture type with separate instruction memory (IM) and separate data memory (DM). Each memory is depicted as a single block even though it may represent a memory hierarchy. Separate memory addressing mechanisms are provided for each memory, namely a data address (DA) generator and a program counter (PC). The program counter generates addresses to instruction memory using a sequential addressing model, modifiable by control instructions of the branch or jump type or intercepts. Addressed instructions are fetched from the instruction memory and decoded (ID) generating the control state signals (IS) and the data signals (DS). The next state of operation is then determined by the sequencer (SQ) based in part upon the decoded instruction signals (IS) and condition signals (C) generated in the execution path. Fetched execute unit (EX) instructions are decoded (ID) generating data signals (DS) for control of operand fetching and execution. The operands are fetched from a general purpose register file (GR) by a selection function, e.g., read ports, and provided to the execution unit from which data outputs (DO) and condition signals (C) are generated.

Functional blocks of the basic RISC SISD model shared between the control path and the execution path can be separated creating the RISC partitioned SISD model. The RISC SISD model in FIG. 1 is modified as follows. First, it is realized that the control path usage of the register file can be independent of the execution path if independent execution means are provided in the sequencer in support of address generation functions. For performance reasons, this type of support is many times provided to allow the address generation function to operate concurrently with the data execution function. Consequently, the general purpose registers (GR) of FIG. 1 can be split into two independent separate register files labeled in FIG. 2 as sequencer general purpose registers (SR) and data path general purpose registers (DR). Second, the instruction decode logic can be split into two independent units, namely, the sequencer instruction decode logic (SD) and the data unit instruction decode logic (DD).

Additional controls are needed to differentiate control path and execution path instructions and dam. These controls can be obtained from the instruction opcodes and by means of program control, e.g., though register file specific load/store instructions. The other operations of the basic control flow remain as described for the model shown in FIG. 1.

Figure 2:
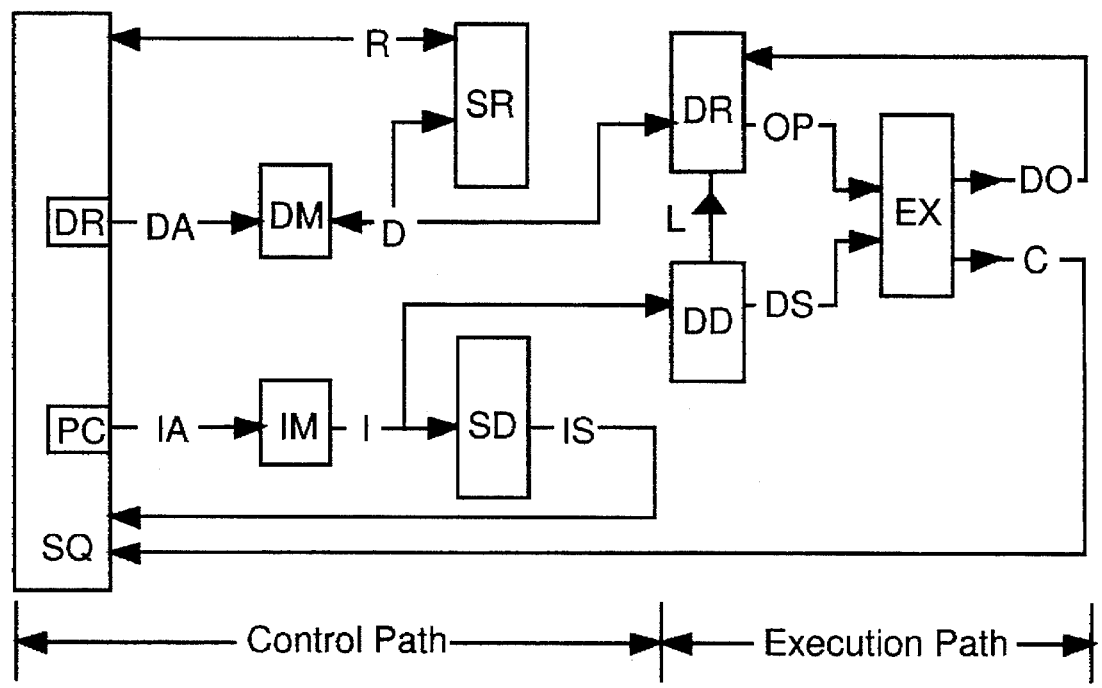
FIG. 2 is an illustration of a RISC partitioned SISD control flow.
Figure 3:
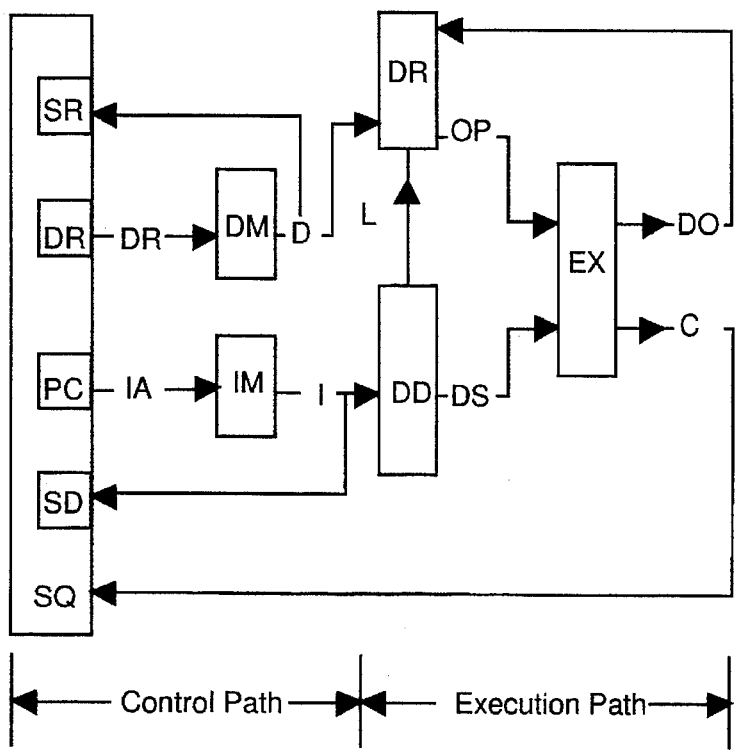
FIG. 3 is an illustration of a simplified RISC partitioned SISD control flow.

For the purposes of the present discussion, the RISC partitioned model, FIG. 2, can be simplified by moving the sequencer general purpose registers (SR) and sequencer instruction decode logic (SD) to inside the sequencer, FIG. 3.

Figure 4:
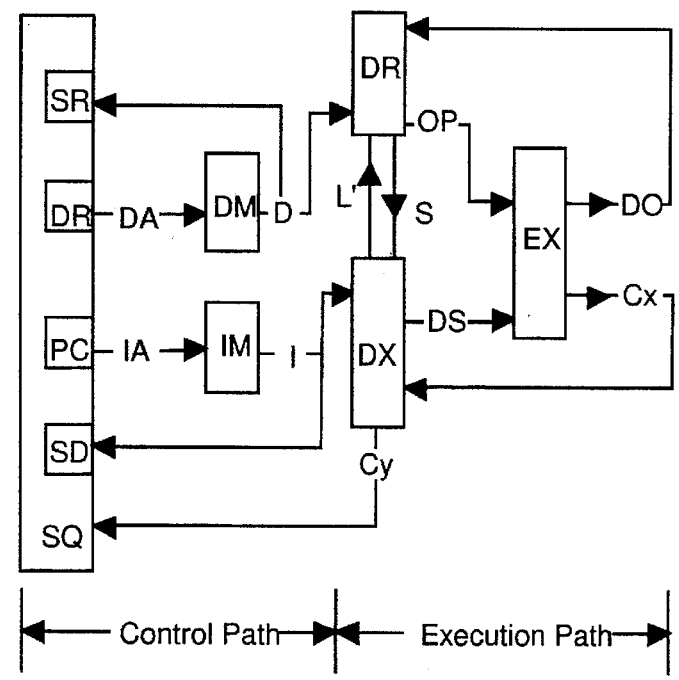
FIG. 4 is an illustration of a conditional select without branching model.
Figure 6:
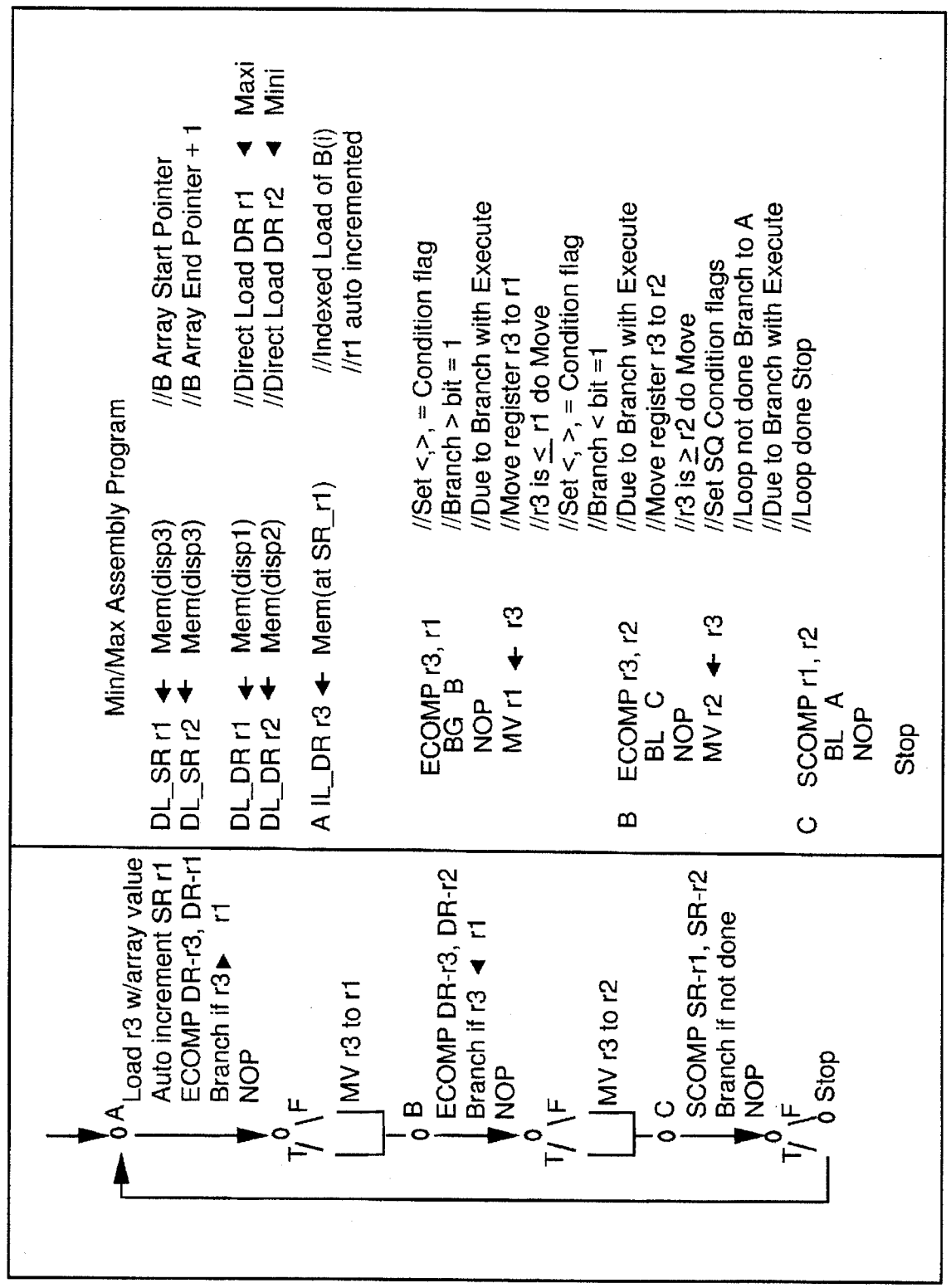
FIG. 6 is an illustration of a Min/Max assembly level program.

The concept of conditional register selection without branching is discussed next. The control flow model used is depicted in FIG. 4 where the changes from the previous model include the separation of two types of condition signals, namely the global condition signals (Cy) and local data path condition signals (Cx). Also, a register selectable bit (S) is sourced from the register file and used in the new data decode and conditional select logic unit (DX). The new DX unit, which includes conditional select logic, generates modified register select signals L', the global condition signals (Cy), and data signals (DS) based upon Cx and/or S as inputs. The concept is that an instruction can be formed that contains a choice of two registers for the specification of a single source or destination where the actual register selected is dependent upon an opcode specified predicate, e.g., a condition signal (Cx) or a register bit (S). The consequence of this type of instruction is that a data dependent conditional operation can be executed without requiring a branch instruction that modifies the sequential instruction stream. In other words, a data dependent control of an instruction sequence is transformed into a data dependent execution sequence, allowing the instruction control flow to remain sequential. For example, a data move type instruction in a 32-bit instruction word architecture can contain sufficient space to identify an additional register selection field to identify either two source operands or two destination operands for predicate selection. With a minimum of two instruction steps, a test condition predicate can be generated followed by a conditional move instruction. To demonstrate how this type of instruction can be used, a well known program will be presented that finds the minimum and maximum of an unordered sequential integer array "B" of "z" elements. This program labeled Min/Max is shown in FIG. 5 and FIG. 6. Note that in the assembly program FIG. 6 a branch with execute model is used requiring an instruction that will execute be placed after the branch instruction. For this program a no-operation (NOP) is used for this instruction.

Using the conditional register select model, FIG. 4, the code can be compacted to that shown in FIG. 7. The significance of this conditional select program is that two branch instructions were removed from the previous code stream, which depending upon the size of the 'B' array can provide a significant performance improvement. Referring to FIG. 4 it can be appreciated that the data dependent conditional branch function which was implemented in the control path has been transformed into a data dependent conditional select function that is now implemented in the execution path. This change improves the sequential instruction stream of control by minimizing the number of branches. This concept can be extended to work off of register bits, e.g., the sign bit of a register. Since the register bits are not affected by execution units in the same manner as the condition codes, a register bit based conditional select function allows multiple arithmetic operations to be accomplished without affecting the test condition stored as a bit in a register.

The concept of a very long instruction word (VLIW) machine and VLIW condition register selection are two new concepts that are introduced in this section. The changes to the previous model are shown in FIG. 8 where multiple execution units (EX1, EX2, . . . ,EXm), a multiple port register (MR), multiple data output buses (DO1, DO2, . . . ,DOm), multiple EX condition signals (C1,C2, . . . ,Cm) multiple port register select signals L', multiple register selectable bits S', and multiple global condition signals Cy' are added to the execution path.

VLIW machines have been used for numerical processing acceleration in scientific applications building upon the extensive instruction level parallelism found in many of these applications. VLIW architectures are characterized by using multiple functional units which are each individually controlled by independent fields in a long instruction word. A VLIW compiler is typically used to obtain efficient coding of the long instruction words, for example Trace scheduling (J. Fisher, "Trace Scheduling: A Technique for Global Microcode Compaction", IEEE Transactions on Computers, July 1981, C-30, pp. 478–490), and Software Pipelining (K. Ebcioglu, "A Compilation Technique for Software Pipelining of Loops with Conditional Jumps", IEEE Micro-20, December 1987) are VLIW compiler techniques already in use.

Many signal processors, e.g. MSP 1.0 and TI's MVP "Mediastation 5000: Integrating Video and Audio", W. Lee, et al., IEEE Multimedia, Summer 1994, p. 50–61, use instructions which produce multiple independent execution actions to occur per instruction cycle. These "compound-instructions" are typically difficult to encode within a single instruction word since they must specify multiple operations. Consequently, the instruction word size may be increased as is the case with TI's MVP RISC processors using 64-bit instruction words, or compromises are typically made in architecting the compound instructions to fit in an existing word size, as in msp 1.0 with 24-bit instructions. Embedding compound functions into fixed word size machines typically limits the flexibility, the generality, and the number of the architected "compound" instructions.

In the surrogate concept, a very long instruction word (VLIW) is created from multiple simplex instructions. Multiple VLIWs can be created and either stored in fixed form in read only memory (ROM) or in programmable form in random access memory (RAM). A surrogate simplex 32-bit instruction is then used to point to a specific VLIW for execution. In the PEs, the VLIWs are stored in a surrogate instruction memory (SIM) made up of multiple instructions slots. Each slot is associated with a specific function, i.e. for each execution unit, a slot for load instructions, and a slot for store instructions, since the Mfast architecture allows for concurrent PE load and store operations. The implication here to note is that multiple "unique" execution units are provided in each PE. The surrogate instruction memory in each PE and in the SPs can be loaded through the use of "segment delimiter instructions" (SDIs). The SDI is inserted into the code stream to identify that the next set instructions are to be loaded into a specific surrogate memory location in each PE and SP.

In FIG. 8 the surrogate and SDI logic as well as the SIM are located in the execution decode (ED) block.

In FIG. 7 the independent steps can be identified as shown in Table 1 where a←b indicates that be is dependent upon the completion of a.

The program flow indicated by the sequential listing in FIG. 7 is governed by the above listing of control relationships. There are a number of ways of "parallelizing" the sequential min/max program example, based upon an understanding of the control flow constraints, that maintains the required correct ordering of operations for successful program completion. For the VLIW condition select model FIG. 8 which contains "unique" execution units, it is realized that operation (d) can be done in parallel with operation (c). The code for this is shown in FIG. 9 where it is assumed that the surrogate VLIW was created during initialization time and the array address pointers and maxint/minint initialization code is removed for clarity. (Note: Other levels of parallelism could be provided if there was a duplication of functions in the execution units, e.g. duplicate compare and condition move functions. The present Mfast model utilizes "unique" execution units to maintain simplicity of the implementation and architecture model.)

Also it can be noticed form the control relationships, Table 1, that the sequencer compare (f) instruction can be executed in parallel with the PE code execution. To accomplish this parallel execution on Mfast it is required that sequencer arithmetic and branch instructions be executed in parallel with PE operations. One method of obtaining this parallel execution on an instruction by instruction basis is through the use of the VLIW concept being extended to include sequencer operations. The consequence is that a surrogate instruction memory is also located in the sequencer instruction decode logic (SD) and that a one to one relationship is maintained for sequencer surrogate VLIWs and PE surrogate VLIWs. In other words, there are two VLIWs, one in the sequencer and one in the PE, that are resident at the same surrogate address allowing independent concurrent executions to occur in both the PE and sequencer. With this implementation the VLIW program code can be further reduced to that shown in FIG. 10 where it is assumed that the surrogate VLIWs were created during initialization time.

Given that the partitioned RISC model was maintained in the VLIW model presented in FIG. 8, the MR, ED, and EX1,EX2, . . . ,EXm blocks are considered as a processing element (PE). By duplicating the PE a 1×2 array is created as shown in FIG. 11. Using SIMD concepts, the two PEs execute the same instruction on both PEs and therefore can be programmed to either process two independent data arrays in parallel or by partitioning a single data array into two segments and processing the sub data arrays in parallel. In the general case this assumes a data memory located in each PE, labeled PM in FIG. 11. After the processing, the results are communicated to the sequence processor or between the PEs allowing further processing. For example, if the data array is n elements long and n is odd then two arrays (9n−1)/2 in length can be processed in parallel with the final algorithm steps selecting between the two sub data array results and the nth element. This approach can be extended to a linear array of N PEs as depicted in FIG. 13 as well as the general $N^2$ 2-D model used in Mfast. Using surrogates in the sequencer as well as the PE results in the further reduced min/max code listing shown in FIG. 12. This code reduces the number of loop iterations due to the parallel computation.

Mfast supports a number of types of conditional execution:

Conditional Move Simplex Instruction

Conditional VLIW Slot Select

Figure 14:
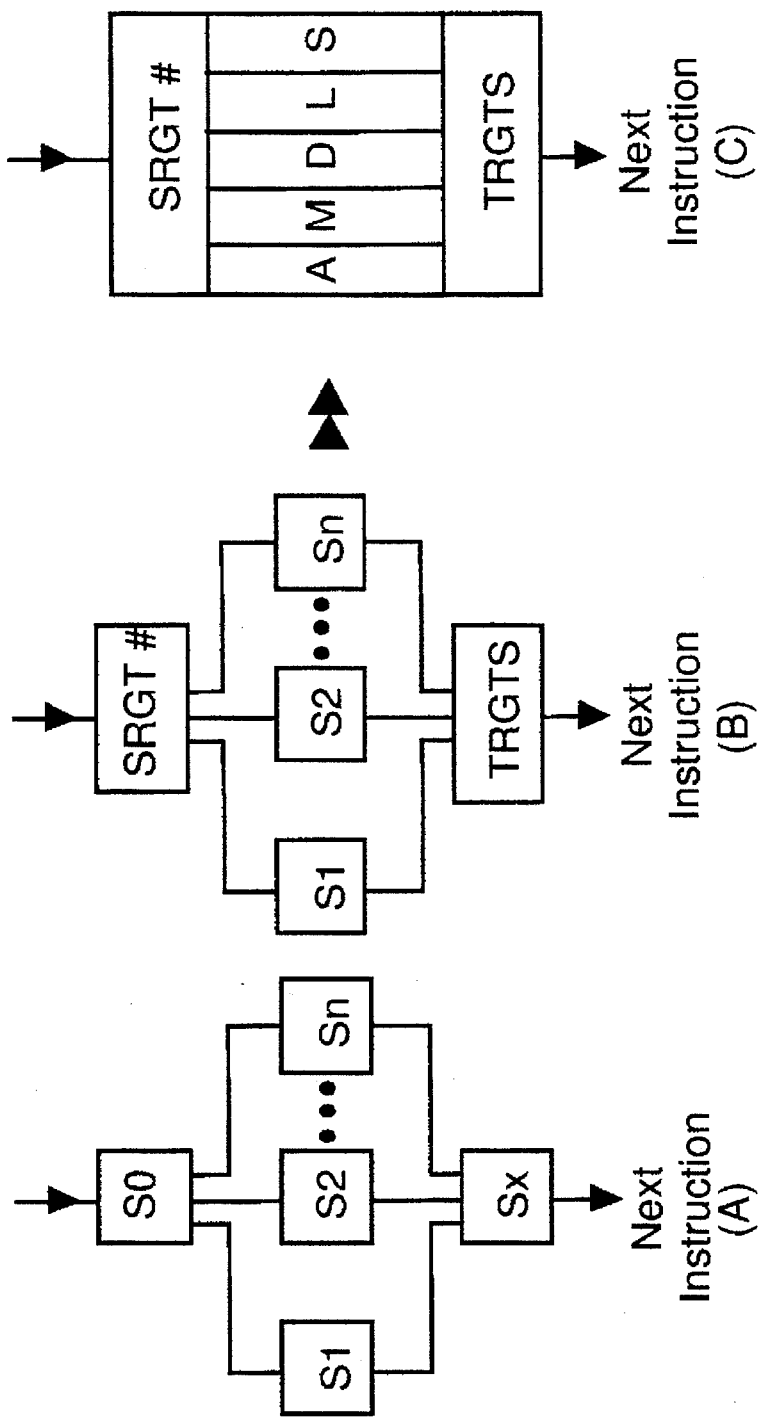

The VLIW concept is described in another way using a variation of the programming concept of a CoBegin and CoEnd originally proposed by Dijkstra (K. Hwang, et al., "Computer Architectures and Parallel Processing," McGraw-Hill, 1984, pp. 535–545.), and depicted in FIG. 14. FIG. 14A is the original concept where S0,S1,S2, . . . , Sn, and Sx are a set of processes where the following code sequence is used:

```
Begin
S0
Cobegin S1; S2; . . . Sn; CoEnd
Sx
End
```

This code explicitly controls the concurrent execution of the independent tasks S1, S2, . . . , Sn. FIG. 14B depicts a surrogate VLIW version of the CoBegin/CoEnd programming constructs. For the surrogate VLIW case, the processes are reduced to single independent instructions that specify their own targets. FIG. 14C is a symbolic notation used to represent the surrogate VLIW flow of FIG. 14b. For Mfast a five slot VLIW is used in each PE, consisting of an ALU, a multiply add unit (MAU), a data select unit (DSU), a load, and a store slot.

In reference to Table 1 another level of parallelism can be obtained by partitioning the problem between the two VLIW PEs. For example, one PE can be executing the minimum compare in parallel to the other PE executing the maximum compare. To accomplish this requires that each PE execute a different instruction/surrogate concurrently which is not a SIMD machine mode of operation, but rather a multiple instruction multiple data (MIMD) type operation. Yet the SIMD mode provides an efficient communication mechanism between the processing elements that a traditional MIMD organization does not provide. What is needed consequently is a hybrid mode of operation in the array of PEs that instills the best of both organizations.

An important aspect of the surrogate/VLIW concept is that there is a one to one mapping between the surrogate address and its associated VLIW. This aspect allows a single surrogate to initiate the execution of up to $N^2$ VLIWs, one each in an array of $N^2$ PEs. By relaxing this one-to-one mapping constraint and using a variation of the programming concept of a CoBegin and CoEnd depicted in FIG. 14, it is possible to execute a different VLIW in each PE while maintaining synchronization. This maintains a one-to-one mapping of the surrogate address to the single entry point access to a group of surrogates. By allowing a small offset address modification to the single entry point surrogate address in each PE, it is possible to select from a group of surrogates in each PE under some constraints, necessary to avoid any hazards.

All sequencers and processing elements contain a common set of execution units including a fixed point/floating point multiply/add unit (MAU), an ALU, and a data select unit (DSU). In addition, the sequencer and PEs each contain SDI and surrogate logic.

Figure 17A:
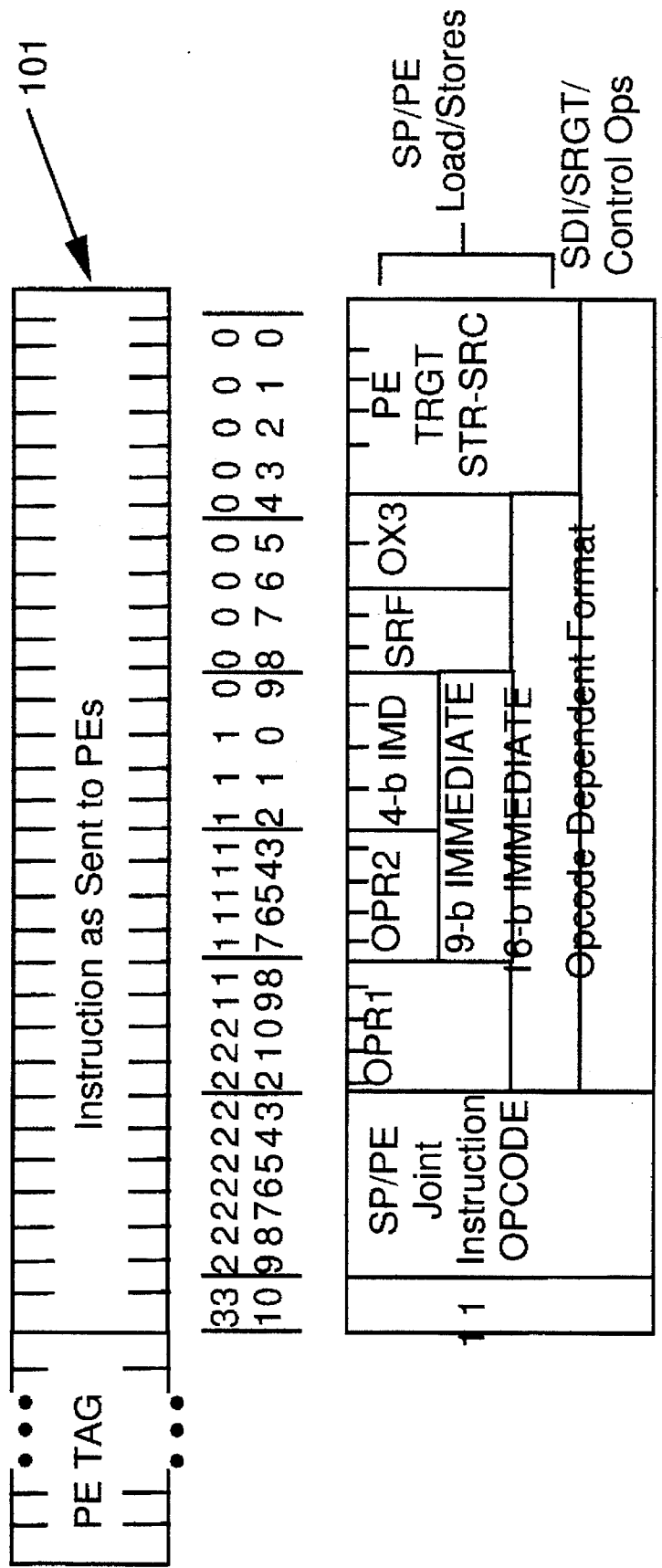
FIG. 17 is an illustration of a joint, SDI and surrogate instruction format.
Figure 17B:
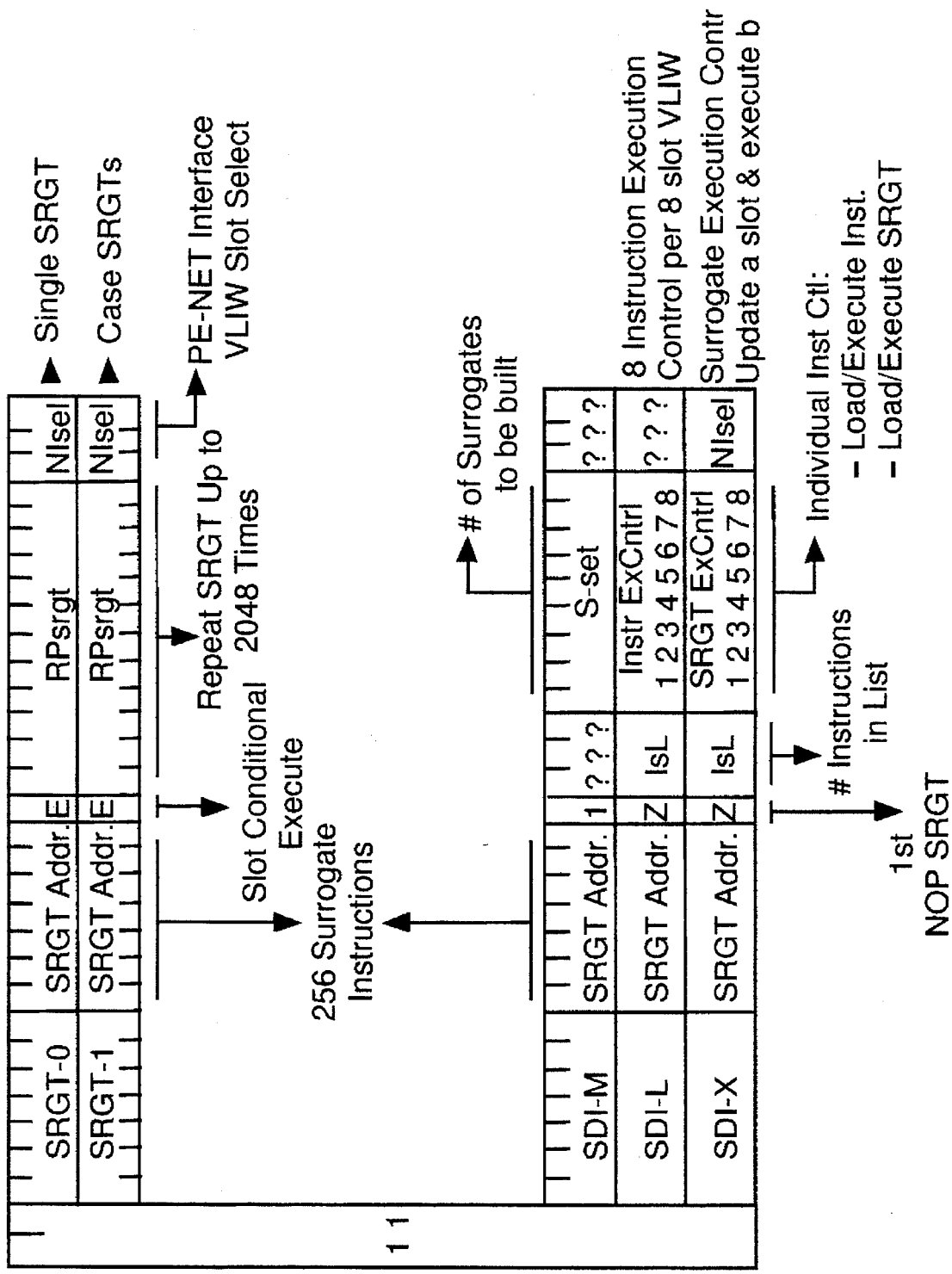

All architected Mfast instructions are of the simplex type since they specify a single functional unit execute action in any SP or PE. Note that the single execute action of some of the functional units may contain dual/quad operations depending upon whether a byte, half-word, or word operation was specified. Compound instructions, i.e., those using multiple functional units in combination with loads/stores, are built up using the surrogate instruction concept. In the surrogate concept, a very long instruction word (VLIW) is created from multiple simplex instructions. Multiple VLIW surrogates can be created by a sequence of instructions which are identified to load the surrogate memory. A surrogate simplex instruction is then used to point to a specific VLIW for execution. A surrogate VLIW is stored in a surrogate memory made up of multiple instruction slots with each slot associated with an execution unit plus one slot assigned for load and one slot for store joint SP/PE instructions. The present Mfast processor is architected for up to an eight slot VLIW word. For the first Mfast implementation, each PE-surrogate VLIW is made up of five slots (ALU, 16×16/32×32-MAU, DSU, load, and store). Up to 256 VLIW surrogates can be specified in each sequencer/PE, as shown in FIG. 17. The load and store options of the surrogate instruction require the joint cooperation of the SP and PEs for proper and safe utilization of the array data buses.

The surrogate instruction memory in each PE and in the SPs can be loaded through the use of "segment delimiter instructions" (SDIs). The SDI is inserted into the code stream to identify that the next set of instructions are to be loaded into a specific surrogate memory location in each PE and SP. The SDI also specifies:

The surrogate instruction memory address, i.e., the surrogate number.

The number of instructions following the SDI that are to be loaded into the specified surrogate.

Loading and execution control:
Load simplex instruction only
Or execution of simplex instruction followed by loading it into the VLIW in the surrogate memory.
Load simplex instruction only or execute surrogate with new instruction replacing the existing slot instruction.
Whether or not to NOP a surrogate prior to loading a new instructions.

Since a slot in surrogate memory is associated with a specific PE execution unit, when creating a new surrogate the new instructions replace existing ones, and if a slot is not replaced the previously specified instruction remains. Consequently, the SDI contains a field which allows the whole surrogate location to be NOPed prior to loading.

FIG. 16 depicts a PE surrogate data flow. Once the surrogate memory has been loaded, surrogate instructions are used to select the appropriate VLIW for execution. Each surrogate contains an address field which identifies the VLIW it represents. There are two types of surrogates presently architected. Surrogate-0 (SRGT-0) provides a one-to-one relationship between the surrogate address and the VLIW. The case surrogate (SRGT-1) provides a one-to-one relationship with a group of surrogates with one entry point, i.e., the surrogate address, to access one VLIW of the group. SRGT-1 is used with an Offset register to generate the surrogate VLIW address in each PE, allowing a different VLIW to be executed in each PE though simultaneously in parallel. To ensure no hazards, a special SDI-M instruction is used to load the surrogates used by SRGT-1. The issuing of a SRGT-1 without previously using a SDI-M is considered an error. FIG. 16 shows and log $_2$N-bit offset register and a small adder used to create the surrogate address. A special PE load instruction allows all PE Offset registers in a 4×4 Mfast processor to be loaded in a single cycle. In addition, to also prevent hazards, the SDI-M instruction list allows only one specification for the load and store slots for all up-to-N SRGT-1 VLIWs.

The segment delimiter instructions, SDI-M, SDI-L, SDI-X, and the surrogate instruction (SRGT-0/1) represent five special joint SP/PE instructions (S/P=11), as shown in FIG. 17. The SDI-L and SDI-X instructions specify that a list of instructions follows for creating and for modifying a surrogate instruction, specified by the surrogate address SRGT address field. The SDI-M instruction specifies that up to 'S' surrogate instructions are to be built using a list of instructions that follows the SDI-M instruction beginning at the surrogate address specified. For the SDI and surrogate instructions, the SRGT address field specifies one out of 256 possible surrogates from surrogate memory. The SDI-L instruction specifies whether an instruction, from the list of instructions, should be executed and loaded or just loaded into the specified surrogate. The SDI-X instruction specifies whether the surrogate instruction should be executed for each instruction of the list, where the instruction in the list replaces an existing VLIW slot prior to execution. This allows for example, the repeated execution of a surrogate where for each execution a slot can be replaced, thereby changing the operand source and/or destination fields. The IsL field in FIG. 17 indicates that a list of up to eight instructions follow the SDI-1 and SDI-X instructions for loading into the specified surrogate. The instruction execution control (Instr ExCntrl) field specifies, individually for up to eight instructions in the list, whether the surrogate VLIW should be executed after loading the specified slot or just a slot-load should occur. The SDI-X allows a low latency method of changing 1 to 8 slot/s prior to executing the surrogate. A special bit, the Z-bit, indicates that NOPs are to be loaded into all slots at the specified surrogate address prior to loading/execute-loading the instructions following the SDI.

Another bit, the E-bit, in the surrogate instruction if a "1" indicates that the specified surrogate is to be unconditionally executed. Alternatively, if the E-bit is a "0" then the PE conditional execute register is used to specify whether a VLIW slot should be executed or NOP'ed. The PE conditional execute register is an architected special purpose register that is accessible by the DSU move and conditional move instructions. The SDI-X and SRGT-0/1 instructions contains a NIsel field to specify which VLIW slot has access to the PE-NET interface port, e.g. a nearest neighbor port, i.e., the NIsel field enables one specified slot's DEST field. The other slots not selected send the results to a local DEST target register.

The SDI-M, SRGT-1 and a PE load offset register instructions are used to provide the capability to load and execute a different VLIW in each PE concurrently and in synchronism as controlled by a single case surrogate instruction (SRGT-1). SDI-M uses the following high level, pseudo cache format:

1. SDI-M SRGT Addr.=X, forced NOP of all surrogate locations, #SRGTs=S-set
   a. Load-Slot instruction (common for all loaded SDI-M surrogates)
   b. Store-Slot instruction (common for all loaded SDI-M surrogates)
   c. SRGT #X+0 instructions at surrogate memory address X
      SRGT #0 MAU slot (NIsel is the same for all MAU instr.s)
      SRGT #0 ALU slot (NIsel is the same for all ALU instr.s)
      SRGT #0 DSU slot (NIsel is the same for all DSU instr.s)
      Continue for any other arithmetic PE slots
   d. SRGT #X+1 instructions at surrogate memory address X+1
      SRGT #1 MAU slot (NIsel is the same for all MAU instr.s)
      SRGT #1 ALU slot (NIsel is the same for all ALU instr.s)

SRGT #1 DSU slot (NIsel is the same for all DSU instr.s)

Continue for any other arithmetic PE slots e. SRGT #X+S-set instruction at surrogate memory address X+S-set SRGT #S-set MAU slot (NIsel is the same for all MAU instr.s)

SRGT #S-set ALU slot (NIsel is the same for all ALU instr.s)

SRGT #S-set DSU slot (NIsel is the same for all DSU instr.s)

Continue for any other arithmetic PE slots

Each PE contains an "Offset" register for use with the SRGT-1 instruction. The "Offset" register contains a value that is less than or equal to $\log_2 N$ for any particular implementation. This offset value is loaded via a PE load offset instruction. When a PE receives a SRGT-1 it adds its offset register value to the SRGT-1's SRGT address field to create the address for selecting the surrogate in each PE. The net result is that a different surrogate instruction can be selected in each PE and executed in synchronism. Since the load/store slots are the same for the up to N surrogates created in each PE, no conflicts occur in accessing the local memories even though different instructions are executing in each PE. To ensure no hazards occur, when the SDI-M is issued a flag bit is set at the SDI-M SRGT address indicating that this a valid case surrogate address. Whenever a SRGT-1 is issued the flag bit at the SRGT-1's SRGT address is tested to see if it was set. If it was not set then an error condition is forced and the SRGT-1 acts as a NOP, otherwise it is executed. In addition, the S-set number indicates the valid offset range allowable for each SRGT-1 allowing another error condition test to prevent hazards from occurring.

Figure 18:
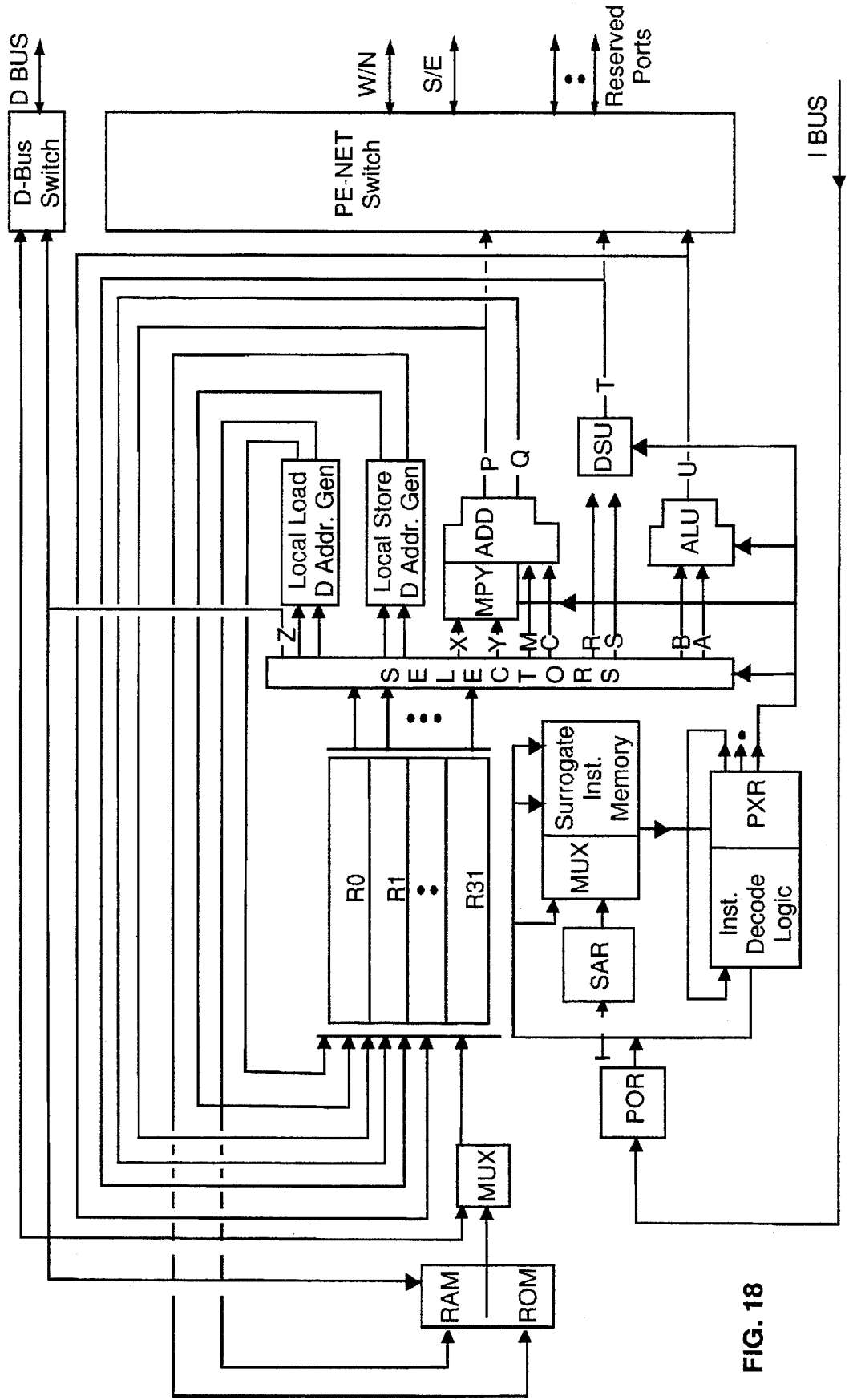
FIG. 18 is an illustration of single-PE (diagonal) node flow with connection interfaces.

FIG. 18 shows the proposed flow for a single-PE processing code. As shown in the figure, the node contains the full complement of components provided by a single PE (MAU, ALU, DSU and GPRF), plus switch/select logic to direct nearest-neighbor and D-bus data to and from the registers. The instruction pipeline path logic which is provided allows for orderly decoding and execution of simplex instructions and surrogate instructions. PE instruction decode and execute registers (their abbreviated names are PDR and PXR) and instruction decode logic are located in each PE. One thing a PE can not do is to determine its own instruction thread (it has no instruction address register and associated sequencing logic). In an Mfast machine, the sequence processors (SPs) serve to accomplish he instruction fetch tasks for both themselves and their associated PEs. The PEs, then, are fed instructions by the SPs. They, in turn, register these instructions (in the PDR) and subsequently decode and execute them.

Another part of the PE instruction pipeline flow is the surrogate instruction memory, or SIM for short. SIM (which may be a combination of registers, RAM, and/or ROM) is included to allow the PEs to execute surrogate VLIW instructions (instructions which cause execute actions in multiple flow elements). When the surrogate is seen in the instruction stream (by logic in the PE), a VLIW instruction specified by the surrogate is accessed from SIM and executed in place of the surrogate. Other logic in the PE facilitates loading VLIW instructions into SIM using specialized SDI instructions. Of course, if some VLIW instructions are held in ROM, it is never necessary to load them. Some combination of ROM- and RAM-based SIM is probably desirable for most applications.

FIG. 19 depicts a high level view of the Mwave array processor machine organization. The machine organization is partitioned into three main pans: the system interfaces including global memory and external I/O, multiple control units with local memory, and the execution array and distributed control PEs. The system interface is an application-dependent interface through which the Mwave array processor interfaces with global memory, the I/O, other system processors, and the personal computer/workstation host. Consequently, the system interface will vary depending upon the application and the overall system design. The control units contain the local memory for instruction and data storage, instruction fetch (I-Fetch) mechanisms, and operand or data fetch mechanisms (D-Fetch). The execution array with distributed control PEs is a computational topology of processing elements chosen for a particular application. For example, the array may consist of N processing elements (PEs) per control unit, with each PE containing an instruction buffer (IBFR), a general purpose register file (GPRF), functional execution units (FNS), communication facilities (COM), and interfaces to its instruction/data buses. The PEs may also contain PE-local instruction and data memories. Further, each PE contains an instruction decode register which supports distributed control of the multiple PEs. Synchronism of local memory accessing is a cooperative process between the control units, local memories, and the PEs. The array of PEs allows computation functions (FNS) to be executed in parallel in the PEs and results to be communicated (COM) between PEs.

With the MSIMD Mfast machine organization, e.g., FIG. 19, it is possible to create single or multiple thread machines wherein the topology of PEs and communication facilities can be configured for a more optimum topology depending upon the application. For example, some possible machine organizations are: multiple linear rings, a nearest neighbor 2-dimension mesh array, a folded nearest neighbor 2-dimension mesh, multiple-fold mesh, a 2-dimension hexagonal array, a folded 2-dimension hexagonal array, a folded mesh of trees, combinations of the above as well as others.

Figures 20, 20B:
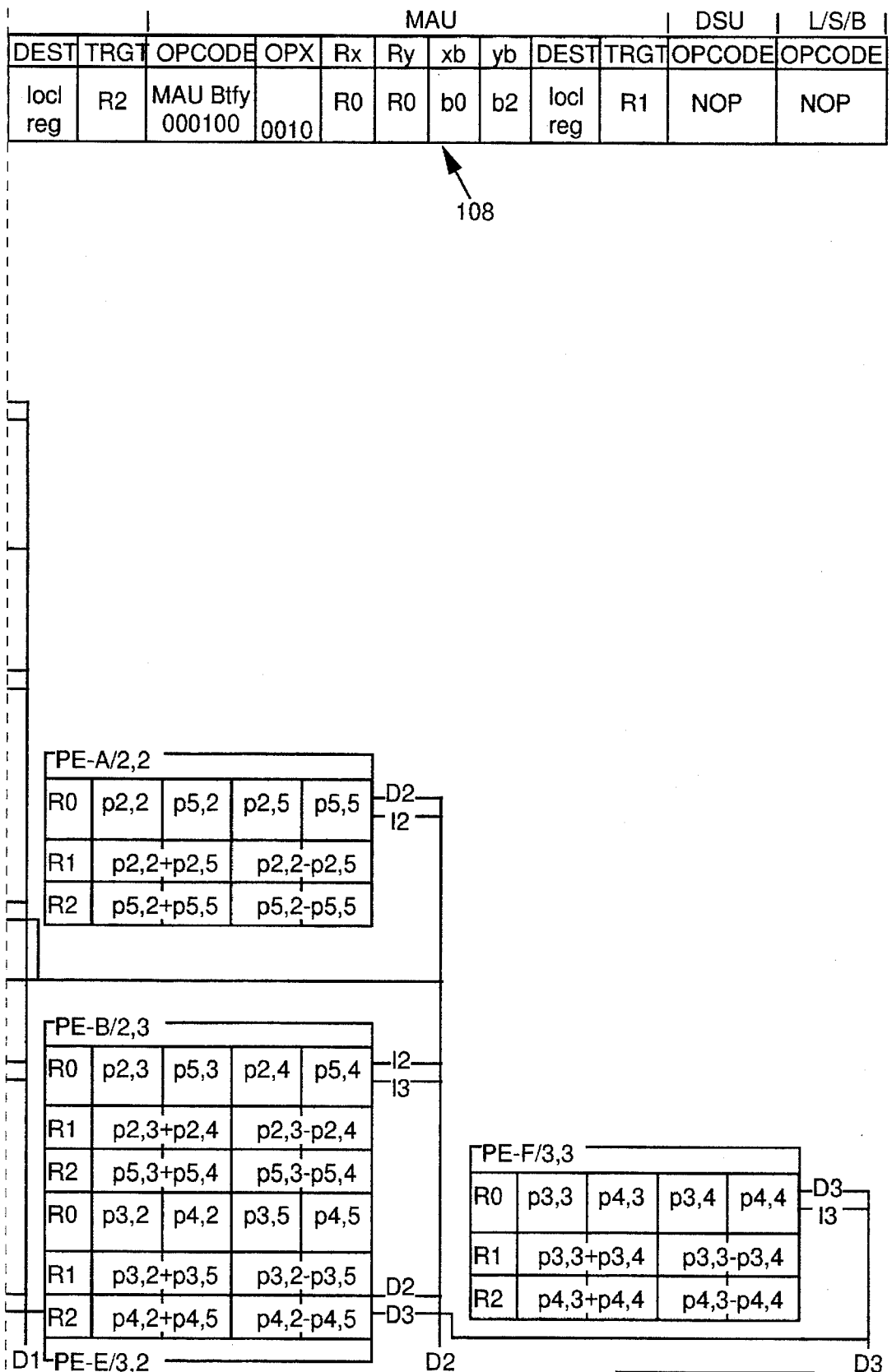
FIG. 20 is an illustration of surrogate quad column butterfly execution results.
Figures 21, 21A:
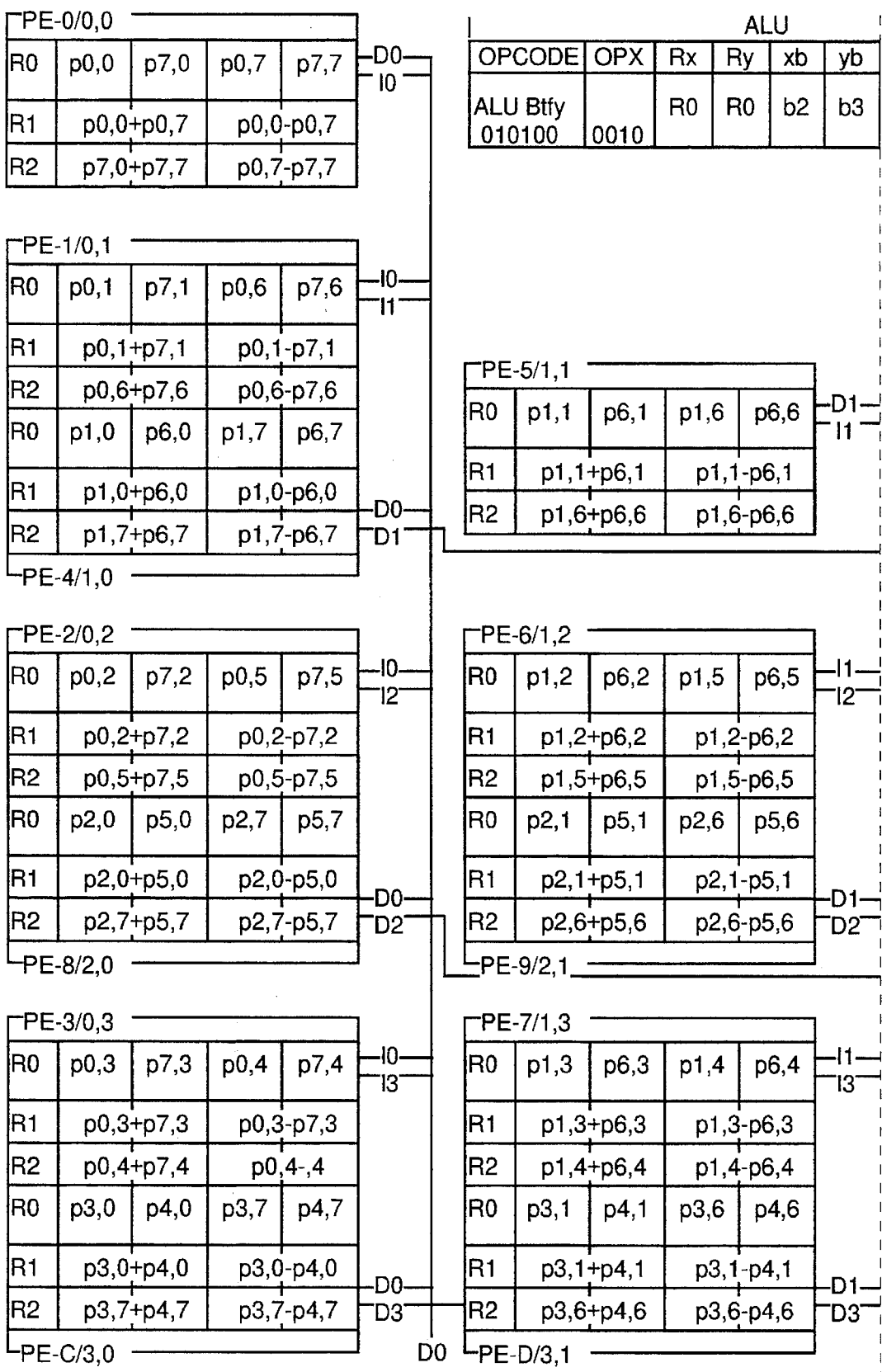
FIG. 21 is an illustration of surrogate quad row butterfly execution results.
Figures 21, 21B:
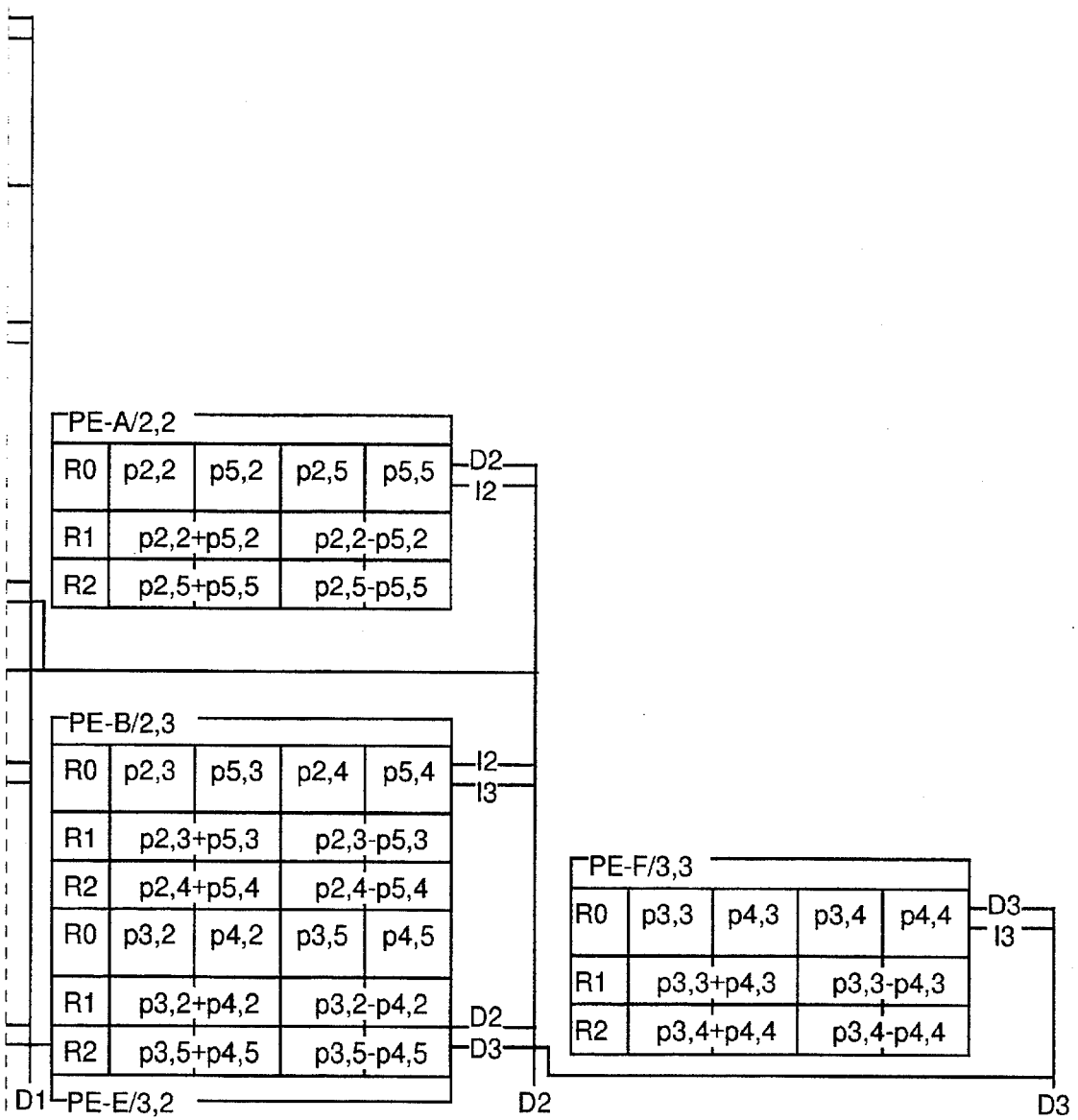

Many algorithms require a "butterfly" type operation on the data, e.g., Fast Fourier Transforms and Discrete Cosine Transforms. The Mfast processor can process butterfly operations in parallel. A code example is given for an 8×8 data array in which the butterfly outputs are calculated for all 8 column/rows each consisting of 8 pels per column/row. Since Mfast contains two add/subtract functional units, the MAU and the ALU, both of which are architected for half-word and dual-byte operations, 64 add/subtracts can be processed per cycle, i.e., 4 per PE. To accomplish this level of parallelism, a surrogate instruction must be created, which can be loaded at initialization time or stored in PE accessible ROMs. In this example, the butterfly outputs are returned to the PEs' local register in their GPRFs. FIG. 20 shows a VLIW instruction 108 for doing the quad column butterfly producing all 32+ and all 32− values with the execution of one instruction. FIG. 21 shows the butterfly VLIW instruction 108 and the execution results on the rows. Please note that 16-bit accuracy is maintained on all butterfly calculations.

Figures 23, 23B:
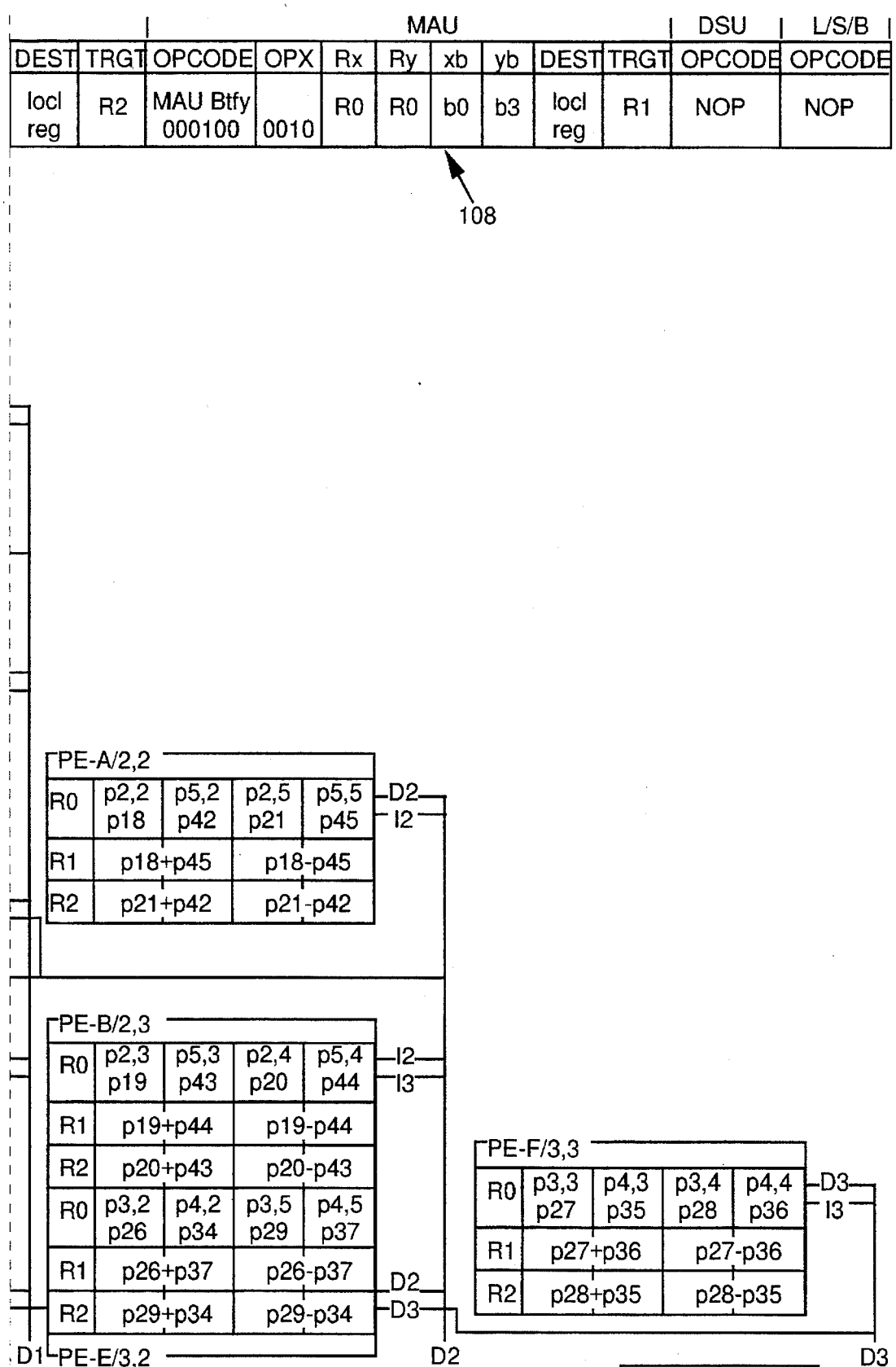
FIG. 23 is an illustration of surrogate quad array butterfly execution results.

It is noted that the folded array processor of FIGS. 20 and 21 can also provide the butterfly operations on 64 data values arranged in an 8×8 format. This is depicted in FIG. 22 where the 64 data values are organized in the 8×8 array, using a single subscript notation in the top cell "p" values. For an N×N array, the butterfly requires $p_b$ be combined with $P_{N^2-1-b}$, i.e., for N=8, $p_0$ is combined with $p_{63}$, $p_1$ with $p_{62}$, etc. For larger size data arrays other butterfly combinations are possible. FIG. 23 depicts the butterfly VLIW instruction 108 and the results on the 64 data values.

The problems and how they are solved summary:

1. provide a scalable compound instruction capability to an array of processing elements each containing multiple functional units, The surrogate instruction concept is extended for use in an array of processing elements.

2. provide a low latency programmable method of modifying the scalable compound instructions, A 2-level decode within the PE's single decode pipeline stage of the surrogate instruction combined with the loaded VLIW slot information, is used to determine the final combined compound execute action that a processing element is to take.

Although a specific embodiment of the invention has been disclosed, it will be understood by those having skill in the art that changes can be made to the specific embodiment without departing from the spirit and the scope of the invention.

TABLE 1

Min/Max Dependency Relationships a, b, . . . , i Program Step Dependencies program entry ← a
a ← b ← c
a ← d ← e
a ← f
c ← g
e ← g
f ← g
g ← a
g ← h
g ← i

What is claimed is:

1. A data processing system, comprising:

a memory means, for storing a first type primary instruction which, when executed performs an operation, a second type primary instruction, which provides an address pointer, and a first and second alternate instructions stored at first and second locations accessed by first and second address pointers, respectively;

a first processor element coupled to said memory means, the first processor element having a first unique offset value, for executing said instructions;

said first processor element including an instruction decode, for processing said first type primary instruction to perform an operation;

said instruction decode of said first processor element processing said first unique offset value thereof with said second type primary instruction to generate a first address pointer to a first alternate instruction in said memory means, and in response thereto said memory means outputting said first alternate instruction to said first processor element;

a second processor element coupled to said memory means, the second processor element having a second unique offset value, for executing said instructions;

said second processor element including an instruction decode, for processing said first type primary instruction to perform an operation;

said instruction decode of said second processor element processing said second unique offset value thereof with said second type primary instruction to generate a second address pointer to a second alternate instruction in said memory means, and in response thereto said memory means outputting said second alternate instruction to said second processor element;

whereby a single instruction broadcast from said memory means, can selectively control diverse operations in said first and second processor elements.

2. The data processing system of claim 1, wherein said memory means further comprises:

a first storage means, for storing said primary instructions; and a second storage means, for storing said alternate instructions.

3. The data processing system of claim 1, wherein said second type primary instructions are surrogate instructions and said alternate instructions are very long instruction words that are larger than said primary instructions.

4. The data processing system of claim 1, wherein said primary instructions have a unit length and said alternate instructions have a length which is an integral multiple of said unit length.

5. The data processing system of claim 1, which further comprises:

each of said first and second processor elements having a first type execution unit and a second type execution unit; and each of said first and second alternate instructions having a first executable portion for execution in said first type execution unit and a second executable portion for execution in said second type execution unit.

6. The data processing system of claim 1, wherein said first unique offset value and said second unique offset value are programmable values.

7. The data processing system of claim 1, which further comprises:

said first alternate instruction being located at a first pointer address having a value equal to the sum of a base value and a first offset value;

said first unique offset value being said first offset value;

said second type primary instruction including said base value;

said first processor element adding said first unique offset value and said base value from said second type primary instruction to generate said first pointer address;

said second alternate instruction being located at a second pointer address having a value equal to the sum of a base value and a second offset value;

said second unique offset value being said second offset value;

said second type primary instruction including said base value; and said second processor element adding said second unique offset value and said base value from said second type primary instruction to generate said second pointer address.

8. The data processing system of claim 1, wherein said first and second processor elements are part of s single instruction, multiple data array.

9. The data processing system of claim 1, which further comprises:

said memory means, storing a third type primary instruction which, when executed performs an operation, a fourth type primary instruction, which provides an address pointer, and a third and fourth alternate instructions stored at third and fourth locations accessed by third and fourth address pointers, respectively;

a third processor element coupled to said memory means, the third processor element having a third unique offset value, for executing said instructions;

said third processor element including an instruction decode, for processing said third type primary instruction, to perform an operation;

said instruction decode of said third processor element processing said third unique offset value thereof with said fourth type primary instruction, to generate a third address pointer to a third alternate instruction in said memory means, and in response thereto said memory means outputting said third alternate instruction to said third processor element;

a fourth processor element coupled to said memory means, the fourth processor element having a fourth unique offset value, for executing said instructions;

said fourth processor element including an instruction decode, for processing said third type primary instruction, to perform an operation;

said instruction decode of said fourth processor element processing said fourth unique offset value thereof with said fourth type primary instruction, to generate a fourth address pointer to a fourth alternate instruction in said memory means, and in response thereto said memory means outputting said fourth alternate instruction to said fourth processor element;

whereby said first, second, third and fourth processor elements are in a multiple instruction, multiple data multiprocessor array.

10. A data processing system, comprising:

a memory means, for storing a first type primary instruction which, when executed performs an operation, a second type primary instruction, which provides an address pointer, and a first and second alternate instructions stored at first and second locations accessed by first and second address pointers, respectively;

a first processor element coupled to said memory means, the first processor element having a first unique offset value, for executing said instructions;

said first processor element processing said first unique offset value thereof with said second type primary instruction to generate a first address pointer to a first alternate instruction in said memory means, and in response thereto said memory means outputting said first alternate instruction to said first processor element;

a second processor element coupled to said memory means, the second processor element having a second unique offset value, for executing said instructions;

said second processor element processing said second unique offset value thereof with said second type primary instruction to generate a second address pointer to a second alternate instruction in said memory means, and in response thereto said memory means outputting said second alternate instruction to said second processor element;

whereby a single instruction broadcast from said memory means, can selectively control diverse operations in said first and second processor elements.

11. A data processing system, comprising:

a memory means, for storing a first type primary instruction which, when executed performs an operation, a second type primary instruction, which provides an address pointer, and a first and second alternate instructions stored at first and second locations accessed by first and second address pointers, respectively;

a first processor element coupled to said memory means, the first processor element having a first unique offset value, for executing said instructions;

said first processor element including an instruction decode, for processing said first unique offset value thereof with said first type primary instruction to perform a first logical operation;

a second processor element coupled to said memory means, the second processor element having a second unique offset value, for executing said instructions;

said second processor element including an instruction decode, for processing said second unique offset value thereof with said first type primary instruction to perform a second logical operation different from said first logical operation;

said instruction decode of said first processor element processing said first unique offset value thereof with said second type primary instruction to generate a first address pointer to a first alternate instruction in said memory means, and in response thereto said memory means outputting said first alternate instruction to said first processor element;

said instruction decode of said second processor element processing said second unique offset value thereof with said second type primary instruction to generate a second address pointer to a second alternate instruction in said memory means, and in response thereto said memory means outputting said second alternate instruction to said second processor element;

whereby a single instruction broadcast from said memory means, can selectively control diverse operations in said first and second processor elements.

12. The data processing system of claim 11, wherein said memory means further comprises:

a first storage means, for storing said primary instructions; and a second storage means, for storing said alternate instructions.

13. The data processing system of claim 11, wherein said second type primary instructions are surrogate instructions and said alternate instructions are very long instruction words that are larger than said primary instructions.

14. A data processing method, comprising:

storing a first type primary instruction which, when executed performs an operation, a second type primary instruction, which provides an address pointer, and a first and second alternate instructions stored at first and second locations accessed by first and second address pointers, respectively;

assigning to a first processor element, a first unique offset value;

processing said first unique offset value with said second type primary instruction to generate a first address pointer to a first alternate instruction, and in response thereto outputting said first alternate instruction to said first processor element;

assigning to a second processor element, a second unique offset value;

processing said second unique offset value with said second type primary instruction to generate a second address pointer to a second alternate instruction, and in response thereto outputting said second alternate instruction to said second processor element;

whereby a single broadcast instruction can selectively control diverse operations in said first and second processor elements.

15. The data processing method of claim 14, wherein said second type primary instructions are surrogate instructions and said alternate instructions are very long instruction words that are larger than said primary instructions.

16. The data processing method of claim 14, wherein said primary instructions have a unit length and said alternate instructions have a length which is an integral multiple of said unit length.

17. The data processing method of claim 14, which further comprises:

each of said first and second processor elements having a first type execution unit and a second type execution unit; and each of said first and second alternate instructions having a first executable portion for execution in said first type execution unit and a second executable portion for execution in said second type execution unit.

18. The data processing method of claim 14, wherein said first unique offset value and said second unique offset value are programmable values.

19. The data processing method of claim 14, which further comprises:

said first alternate instruction being located at a first pointer address having a value equal to the sum of a base value and a first offset value;

said first unique offset value being said first offset value;

said second type primary instruction including said base value; and said first processor element adding said first unique offset value and said base value from said second type primary instruction to generate said first pointer address.

20. The data processing method of claim 19, which further comprises:

said second alternate instruction being located at a second pointer address having a value equal to the sum of a base value and a second offset value;

said second unique offset value being said second offset value;

said second type primary instruction including said base value; and said second processor element adding said second unique offset value and said base value from said second type primary instruction to generate said second pointer address.

21. A data processing system, comprising:

a memory means, for storing a first type primary instruction which, when executed performs an operation, a second type primary instruction, which provides an address pointer, and a first and second alternate instructions stored at first and second locations accessed by first and second address pointers, respectively;

said memory means further storing a segment delimiter instruction and a first and second simplex instructions, each of said alternate instructions having a first slot portion capable of storing said first simplex instruction and a second slot portion capable of storing said second simplex instruction;

a first processor element coupled to said memory means, the first processor element having a first unique offset value, for executing said instructions;

said first processor element including an instruction decode, for processing said first type primary instruction to perform an operation;

said instruction decode of said first processor element processing said first unique offset value thereof with said second type primary instruction to generate a first address pointer to a first alternate instruction in said memory means, and in response thereto said memory means outputting said first alternate instruction to said first processor element;

said instruction decode of said first processor element processing said first unique offset value thereof with said segment delimiter instruction to insert said first simplex instruction in said first slot portion and said second simplex instruction in said second slot portion of said first alternate instruction;

a second processor element coupled to said memory means, the second processor element having a second unique offset value, for executing said instructions;

said second processor element including an instruction decode, for processing said first type primary instruction to perform an operation;

said instruction decode of said second processor element processing said second unique offset value thereof with said second type primary instruction to generate a second address pointer to a second alternate instruction in said memory means, and in response thereto said memory means outputting said second alternate instruction to said second processor element;

said instruction decode of said second processor element processing said second unique offset value thereof with said segment delimiter instruction to insert said first simplex instruction in said first slot portion and said second simplex instruction in said second slot portion of said second alternate instruction;

whereby an instruction broadcast from said memory means, can selectively control diverse operations in said first and second processor elements.

22. The data processing system of claim 21, which further comprises:

said segment delimiter instruction including a first execution flag for said first simplex instruction and a second execution flag for said second simplex instruction;

said processor elements selectively executing said first simplex instruction and inserting it into said first slot portion of said alternate instructions, in response to said first execution flag; and said processor elements selectively executing said second simplex instruction and inserting it into said second slot portion of said alternate instructions, in response to said second execution flag.

23. The data processing system of claim 21, which further comprises:

said segment delimiter instruction including a first execution flag for said first simplex instruction and a second execution flag for said second simplex instruction;

said processor elements selectively executing said first simplex instruction in said first slot portion of said alternate instructions, in response to said first execution flag; and said processor elements selectively executing said second simplex instruction in said second slot portion of said alternate instructions, in response to said second execution flag.

* * * * *